United States Patent
Jeong et al.

(10) Patent No.: US 10,089,340 B2
(45) Date of Patent: Oct. 2, 2018

(54) GROUP MEMBER MANAGEMENT SUPPORT SYSTEM AND METHOD

(71) Applicant: D2 Emotion Co., Ltd., Cheongju-si, Chungcheongbuk-do (KR)

(72) Inventors: Ji Young Jeong, Chungcheongbuk-do (KR); Kwang Su Kim, Chungcheongbuk-do (KR)

(73) Assignee: D2 Emotion Co., Ltd., Cheongju-si (KR)

( * ) Notice: Subject to any disclaimer, the term of this patent is extended or adjusted under 35 U.S.C. 154(b) by 488 days.

(21) Appl. No.: 14/759,955

(22) PCT Filed: Jan. 10, 2014

(86) PCT No.: PCT/KR2014/000326
§ 371 (c)(1),
(2) Date: Jul. 9, 2015

(87) PCT Pub. No.: WO2014/115990
PCT Pub. Date: Jul. 31, 2014

(65) Prior Publication Data
US 2015/0379055 A1    Dec. 31, 2015

(30) Foreign Application Priority Data

Jan. 24, 2013  (KR) .................. 10-2013-0007814
Jul. 18, 2013  (KR) .................. 10-2013-0084545

(51) Int. Cl.
*G06F 7/00* (2006.01)
*G06F 17/30* (2006.01)
(Continued)

(52) U.S. Cl.
CPC .... *G06F 17/30321* (2013.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS

2002/0138271 A1    9/2002  Shaw
2004/0221224 A1*  11/2004  Blattner .............. H04L 12/1822
                                                       715/201
(Continued)

FOREIGN PATENT DOCUMENTS

JP    04-261247 A      9/1992
JP    2004-252668 A    9/2004
(Continued)

OTHER PUBLICATIONS

Aug. 16, 2016, Japanese Office Action for related JP application No. 2015-555093.
(Continued)

*Primary Examiner* — Tuan A Pham
(74) *Attorney, Agent, or Firm* — Paratus Law Group, PLLC

(57) ABSTRACT

A group member management support system and method are disclosed for effectively supporting group member management such as analysis of psychological states of students in a school and figuring out friend relations of students accordingly. The group member management support system includes a database storing self-expression index representing psychology or feeling of each member of a group, an interface server receiving the self-expression index through a network from the member to store the self-expression index in the database, and a member's terminal receiving the self-expression index to transmit the self-expression index to the interface server through the network; and a manager's terminal requesting and receiving the
(Continued)

self-expression index from the interface server through the network to display or output the self-expression index.

18 Claims, 26 Drawing Sheets

(51) Int. Cl.
    *G06Q 50/20*     (2012.01)
    *G06Q 10/10*     (2012.01)
    *G06F 3/0481*     (2013.01)
    *G06F 3/0484*     (2013.01)
    *G06Q 50/00*     (2012.01)

(52) U.S. Cl.
    CPC ..... *G06F 17/30876* (2013.01); *G06Q 10/101* (2013.01); *G06Q 10/105* (2013.01); *G06Q 50/01* (2013.01); *G06Q 50/20* (2013.01)

(56) References Cited

U.S. PATENT DOCUMENTS

| | | | |
|---|---|---|---|
| 2007/0050151 A1* | 3/2007 | Satoh | A61B 5/165 |
| | | | 702/19 |
| 2007/0168863 A1* | 7/2007 | Blattner | G06F 3/011 |
| | | | 715/706 |
| 2008/0091515 A1* | 4/2008 | Thieberger | G06Q 10/04 |
| | | | 705/7.11 |
| 2008/0253538 A1 | 10/2008 | Lennartsson | |
| 2013/0290339 A1* | 10/2013 | LuVogt | G06F 17/30867 |
| | | | 707/740 |

FOREIGN PATENT DOCUMENTS

| | | |
|---|---|---|
| JP | 2006-106711 A | 4/2006 |
| JP | 3162025 U | 8/2010 |
| JP | 2011-123779 A | 6/2011 |
| KR | 10-2000-0059099 A | 10/2000 |
| KR | 10-2002-0060299 A | 7/2002 |
| KR | 10-0582987 B1 | 5/2006 |
| KR | 10-2006-0062614 A | 6/2006 |
| KR | 10-2006-0104734 A | 10/2006 |
| KR | 10-0661743 B1 | 12/2006 |
| KR | 10-2007-0008417 A | 1/2007 |
| KR | 10-2007-0070803 A | 7/2007 |
| KR | 10-2009-0014088 A | 2/2009 |
| KR | 10-2012-0026726 A | 3/2012 |

OTHER PUBLICATIONS

European Search Report for EP Application No. 14 743 252.0 dated Aug. 25, 2016 from European Patent Office.
International Search Report for PCT/KR2014/000326 dated Apr. 29, 2014 from Korean Intellectual Property Office.

* cited by examiner

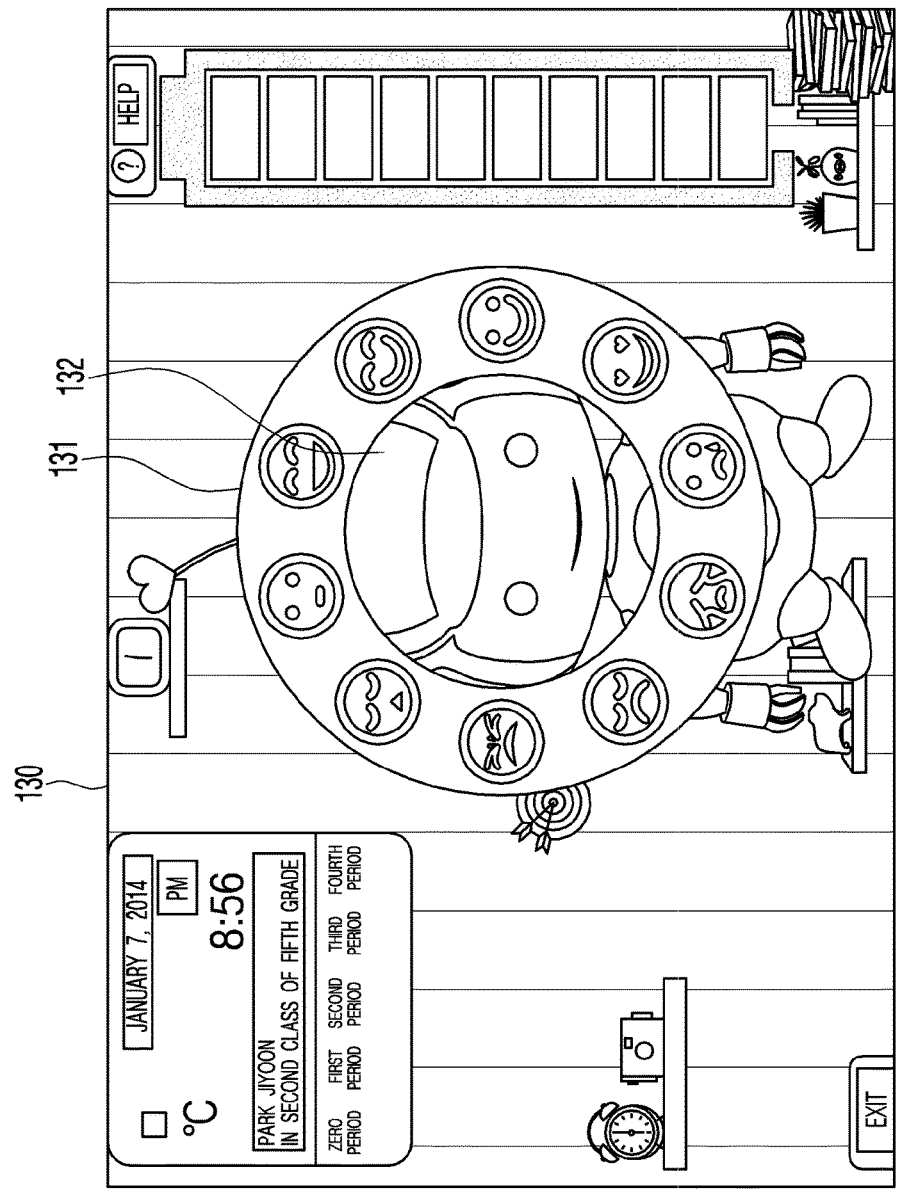

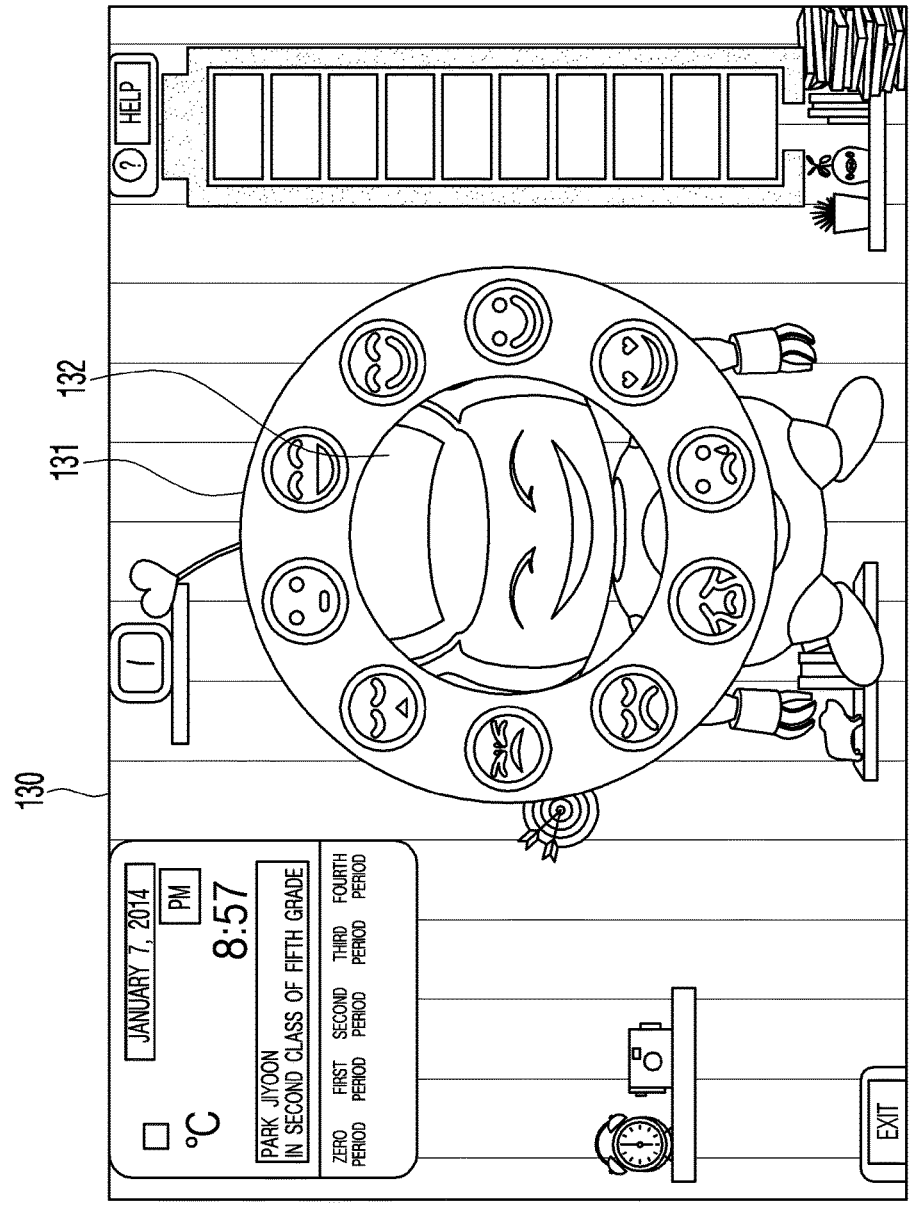

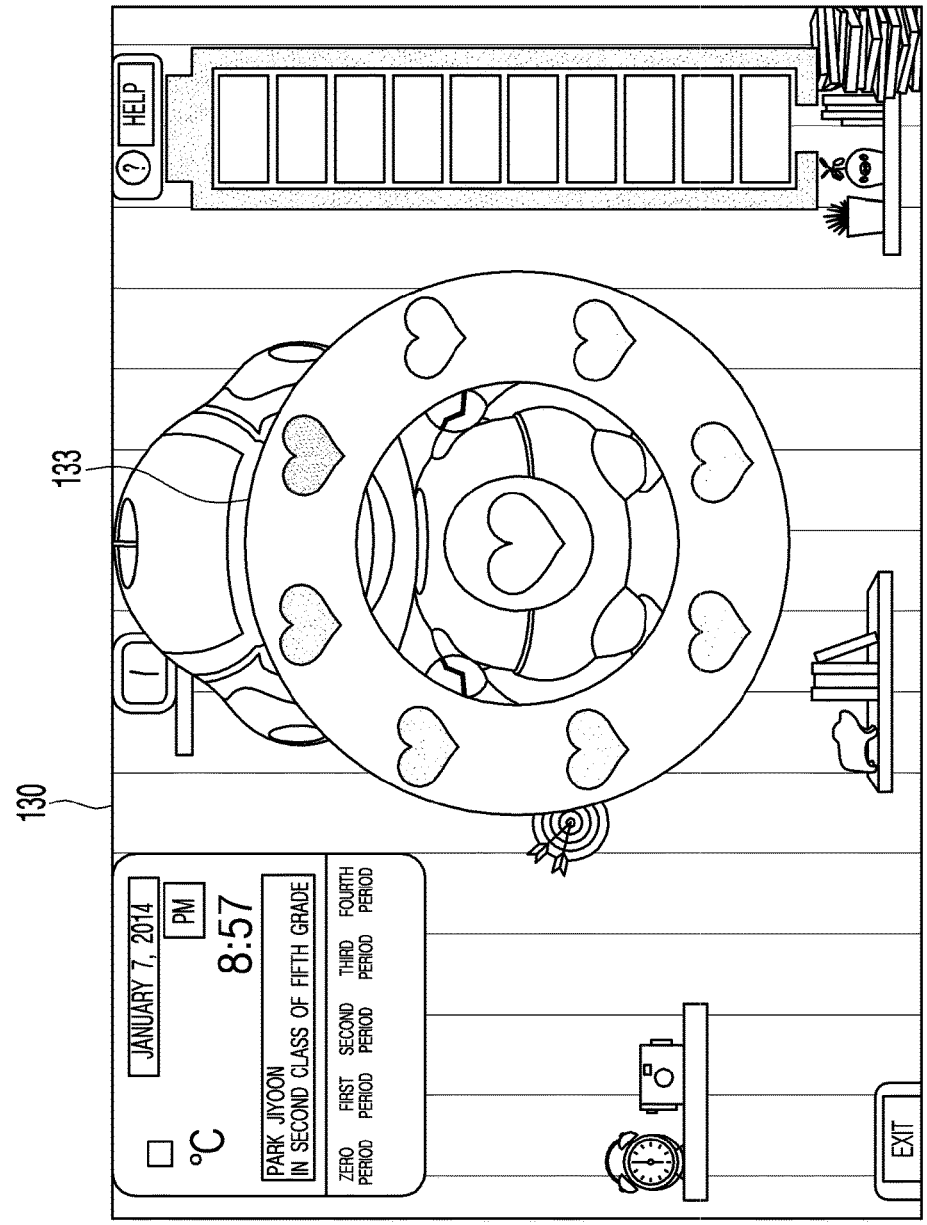

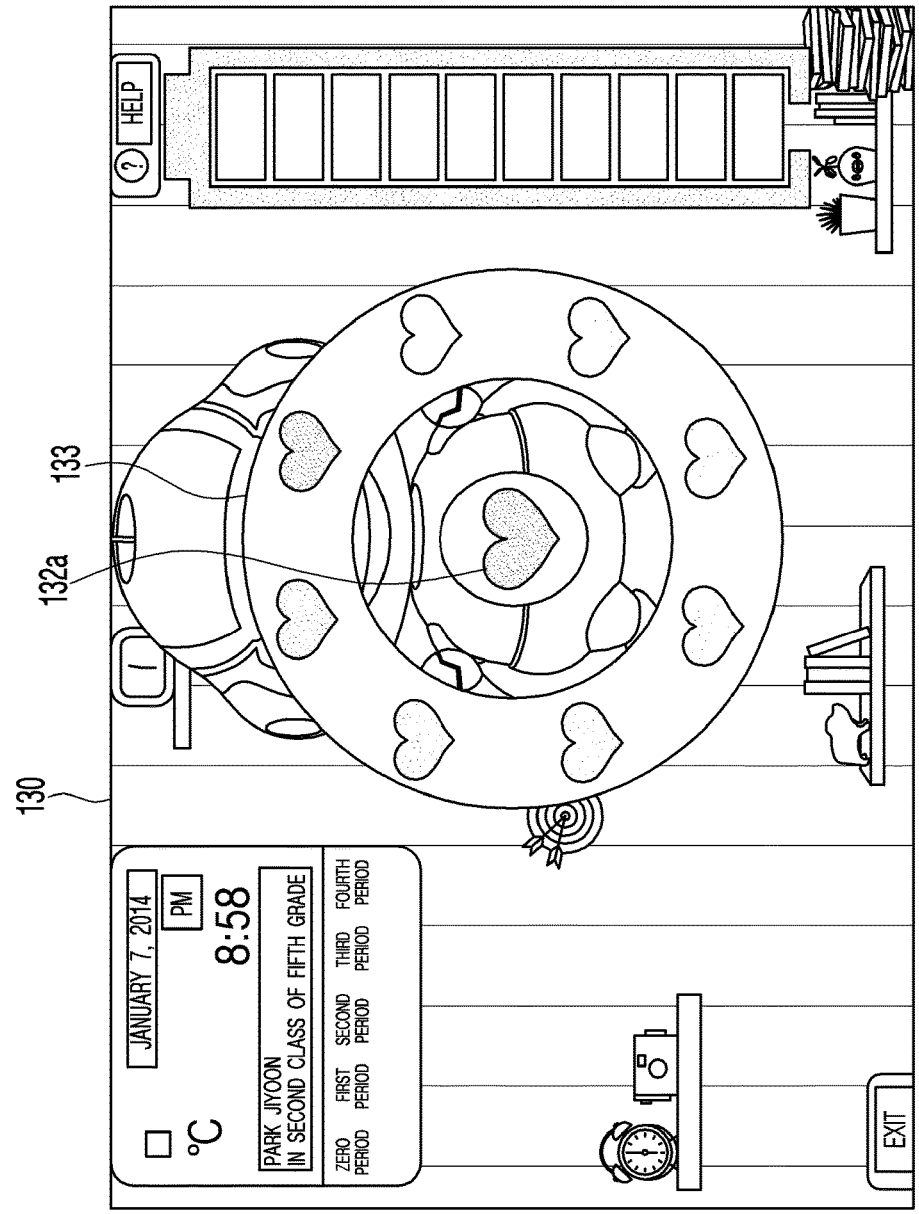

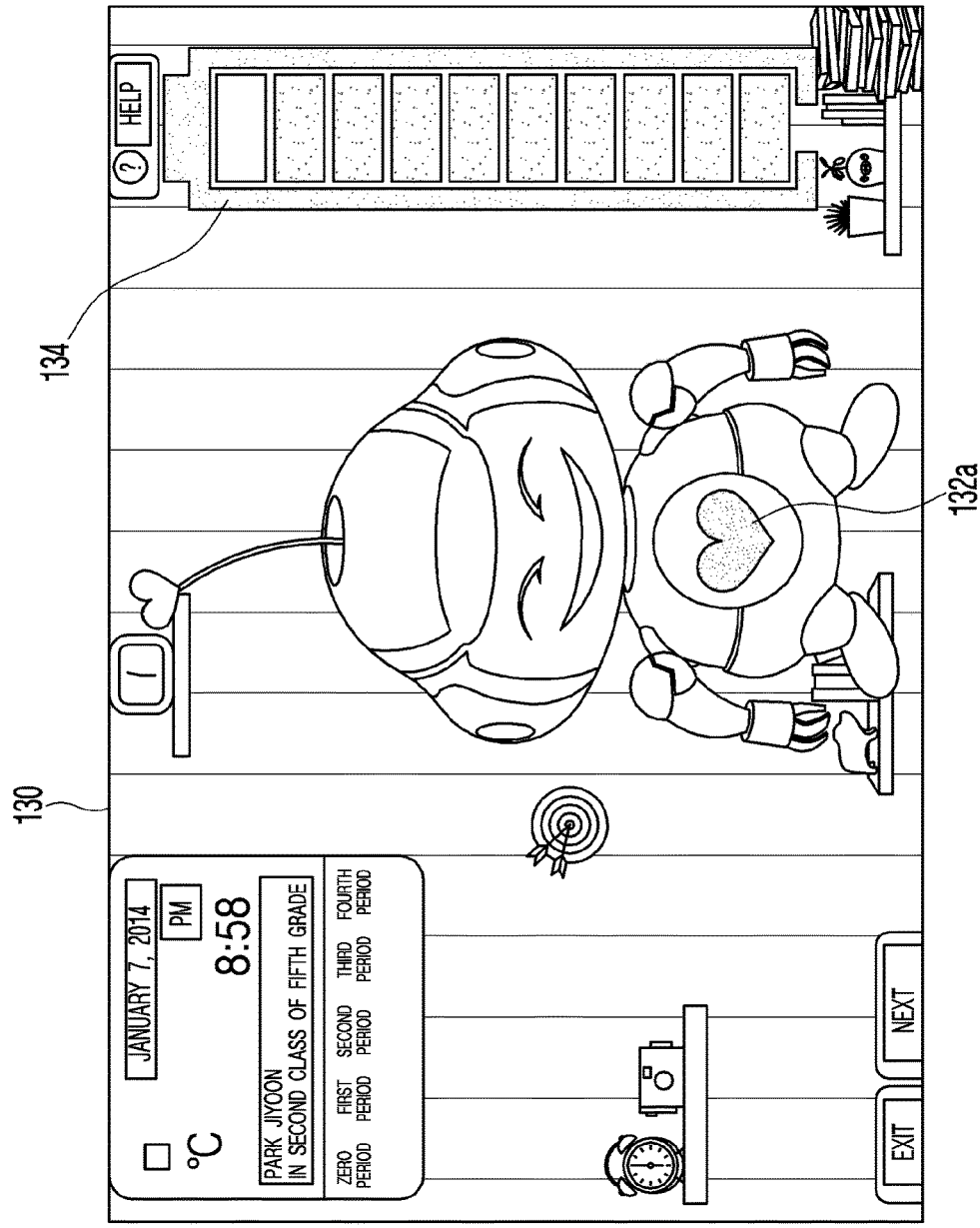

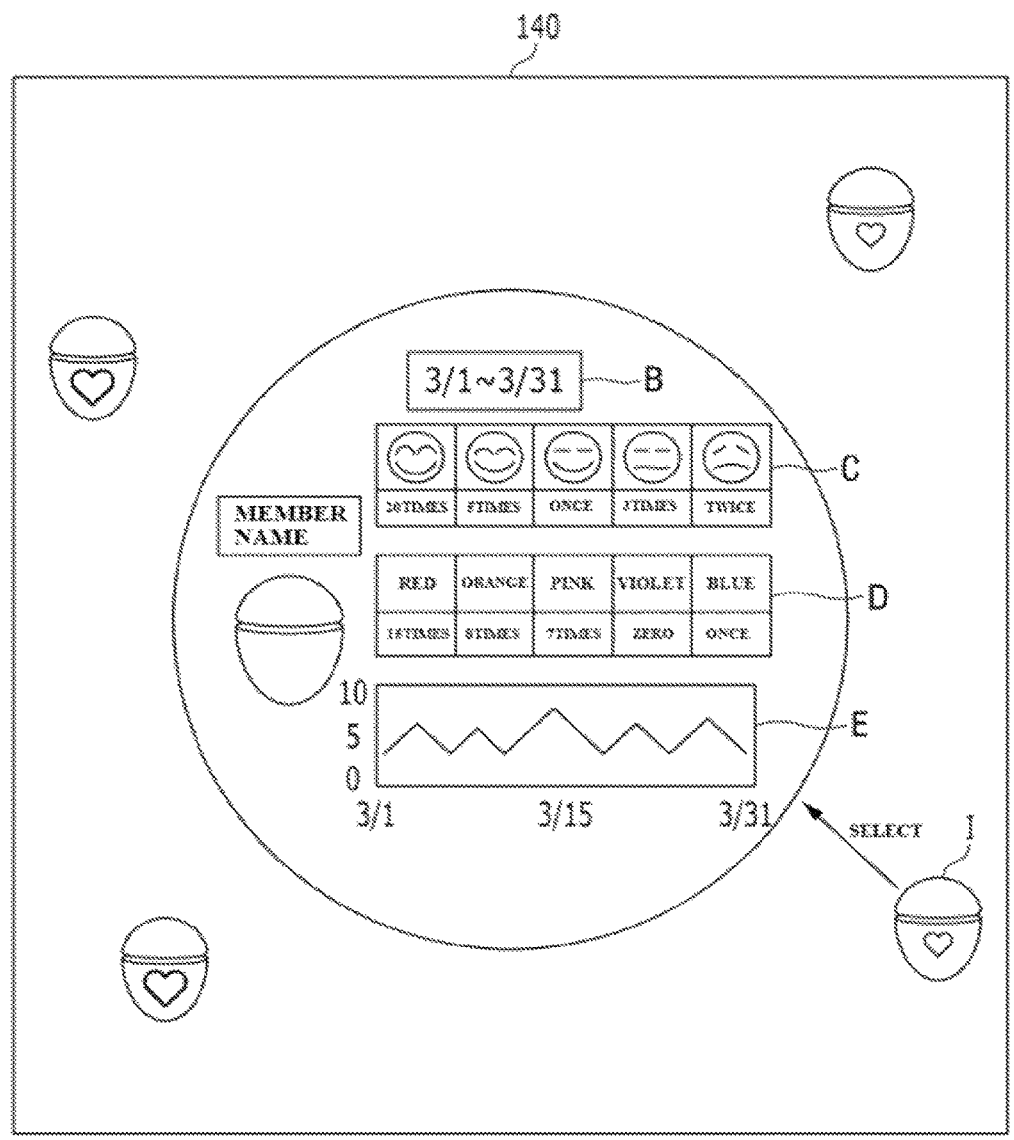

GROUP MEMBER MANAGEMENT SUPPORT SYSTEM AND METHOD

CROSS REFERENCE TO PRIOR APPLICATION

This application is a National Stage Patent Application of PCT International Patent Application No. PCT/KR2014/000326 (filed on Jan. 10, 2014) under 35 U.S.C. § 371, which claims priority to Korean Patent Application Nos. 10-2013-0007814 (filed on Jan. 24, 2013) and 10-2013-0084545 (filed on Jul. 18, 2013), which are all hereby incorporated by reference in their entirety.

BACKGROUND

The present invention relates to a group member management support system and method, and in particular, to a system and method for effectively supporting group member management such as analysis of psychological states of students in a school and figuring out friend relations of students accordingly.

From kindergartners to high school students, a school in which children or youths congregate is a space of education, and sufficient regards and management are necessary for the students and their protectors.

Recently, as the society is entirely complicated and advanced, competition between students in a school becomes particularly intensified and mutual fellowship becomes gradually diluted in the competitive environment. In addition, due to a tendency of individualism and surrounding environmental change, school accidents such as student violence, bullying, and safety accident rapidly increase. Each student tries to make fellowship with friends close to him/her. In such a process, the student may feel stressed on human relations, hurt each other, and in a serious case, be placed in a situation of fearing human relations and disconnecting exchange with the outside. In such an environment, a tendency of individualism causes one member or one category members to be excluded and neglected due to selfishness of a specific student or group, and due to dejection, the excluded member gets depressed or is in an unstable situation or is treated as an outcast.

Although going to school everyday and meeting faculties, in particular, a class teacher, the students live in an environment with insufficient communication. Accordingly despite of a chance of counsel with a teacher, it is not practically easy to face the teacher and get worries out. Similarly, it is hard for a teacher to properly reach close cooperation with protectors on the basis of counsels with the students.

Furthermore, various measures are introduced for effectively managing psychological states, personal relations, s sense of accomplishment or the like for various social objects by using a computerized system.

Korean Patent Application Laid-open Publication No. 2012-0026726 discloses an interaction system that a child or youth member accesses a web site through a terminal to transmit a message including worries or questions to a reliable or wanting virtual or real opponent, and a professional counselor reviews the message to transmit a proper response message to each member having written the message, thereby enabling the member to take psychological stability by taking consolation, encouragement, and courage.

In addition, Korean Patent No. 0582987 discloses a method of providing a network psychotherapy service enabling a user to improve concentration and accomplishment in a process for selecting a color and drawing a picture or pattern by delivering to a controller a position of a pixel determined according to user' selection, delivering to the controller a color ratio determined according to user's selection, and designating a color according to a selected color ratio for the pixel selected by the user.

In addition, Korean Patent Application Laid-open Publication No. 2000-0059099 discloses a computer-based mentoring system enabling proper human relations between students, and between teachers and students to be made through steps of beginning—design—education—connection between mentor and protégé—mentoring activity—evaluation—follow-up management.

In addition, Korean Patent Application Laid-open Publication No. 2002-0060299 discloses an unattended counsel system for assuring anonymity of a counselee and preventing school violence by indirectly exchanging ideas by using an automatic response system (ARS) without direct meeting or calling in voice between the counselee and counselor In addition, Korean Patent Application Laid-open Publication No. 2006-0104734 discloses a method for providing a customer management service for preventing depression, which may solve an unstable psychological state such as depression through a step of selecting and transmitting a message or customer management content by using a mobile communication terminal.

In addition, Korean Patent Application Laid-open Publication No. 2007-0070803 discloses an integrated school management system for simplifying a line management method to unify all operating systems into a computer GUI environment by integrating various school management facilities installed in a school by using a wired intranet that is a school computer network and wireless communication.

However, the related techniques do not suggest a measure for effectively supporting student management by a class teacher by analyzing psychological states of group members, in particular, school students and accordingly figuring out friend relations easily therebetween. Accordingly, as a measure for solving such limitations, a detailed method for actively using recent computer technology is required.

SUMMARY

Embodiments of the present invention provides a group member management support system and method, and a computer readable recording medium having a computer program recorded thereon for executing the method by effectively analyzing psychological states of group members, in particular, of school students and figuring out friend relations of students accordingly.

According to an aspect of the present invention, a group member management support system includes: a database storing self-expression index representing psychology or feeling of each member of a group; an interface server receiving the self-expression index through a network from the member to store the self-expression index in the database; a member's terminal receiving the self-expression index to transmit the self-expression index to the interface server through the network; and a manager's terminal requesting and receiving the self-expression index from the interface server through the network to display or output the self-expression index, wherein the self-expression index is represented as an index including avatar expression changing according to a state where any one of two or more icon shapes preset in the member' terminal in correspondence to psychology or feeling of the member and an input point among points preset in the member's terminal, the interface server may include a self-expression index statistics generation module to store the generated self-expression index statistics in the database, and the manager's terminal requests and receives from the internet server the self-expression index statistics during a predetermined period through the network to display or output the self-expression index statistics, the self-expression index statistics may include change details in the avatar's expression and points during the predetermined period, and when receiving the self-expression index statistics included in a range of the number of specific avatar expression times and a point range preset in the manager's terminal during a predetermined period, the manager's terminal displays or outputs a notification about who is a corresponding member.

The interface server may receive the self-expression index from the member through a web browser or an application installed in a mobile device.

The preset two or more icon shapes may be displayed around a region where the avatar expression is displayed in the member's terminal till the avatar expression changes, and a color unit may be displayed which represents a degree of psychology or feeling of the member in a portion of region of the avatar other than the avatar expression, and a color wheel may be displayed therearound till the time of change thereof according to an input of the color wheel where two or more colors are deployed.

When receiving the self-expression index included in the number of a specific color times preset in the manager's terminal during the predetermined time, the manager's terminal may display or output the notification about who is the corresponding member.

The self-expression index statistics may further include an average of the point during the predetermined period, wherein when receiving the self-expression index included in a range of the average point pre-determined in the manager's terminal during the predetermined time, the manager's terminal displays or outputs the notification about who is the corresponding member.

The interface server may include an item management module generating and processing a virtual compensation item, stores information on the generated and processed item in the database, request and receive the item from the interface server through the network, and transmit the item to an arbitrary member's terminal through the network, and the member's terminal transmitting the item to another member's terminal, and the interface server may calculate statistics for the item processed by the item management module and store the calculated item process statistics in the database, and the manager' terminal may request and receive from the interface server the item process statistics through the network to display or output the item process statistics, the item process statistics may include the change details in the number of item transmission and reception times for each member, and the manager's terminal may display or output a flowchart of item exchanges between members during the predetermined period.

When receiving the item process statistics included in a range of the number of item reception times or a range of the number of possessed items preset in the manager's terminal during the predetermined time, the manager's terminal may display or output the notification about who is the corresponding member.

The manager's terminal may display or output the flowchart of the item exchange between members selected according to selection of an icon symbolizing the self-expression index for each member displayed on the manager's terminal, or display or output the number of item transmission and reception times preset in the manager's terminal during the predetermined period.

The manager's terminal may display or output other members in an order of the large number of the item transmission and reception times preset in the manager's terminal during the predetermined period on the basis of members selected according to selection of an icon symbolizing the self-expression index for each of the members displayed on the manager's terminal.

The interface server may include a mail management module managing mails transmitted and received between members through the member's terminals to store the transmitted and received mails in the database and calculates statistics for the transmitted and received mails, and store the calculated mail statistics in the database, and the manager's terminal may request and receive the mail statistics from the internet server through the network to display or output the mail statistics, the mail statistics may include the number of mail transmission and reception times during the predetermined period between members, and the manager's terminal may display or output the number of mail transmission and reception times during the predetermined period.

The mail may include a voice mail, and the member's terminal may include a voice modulation unit capable of selecting a specific voice mode at the time of transmitting the voice mail.

According to another aspect of the present invention, a group member management support system includes: a database storing self-expression index representing psychology or feeling of each member of a group; an interface server receiving the self-expression index through a network from the member and storing the self-expression index in the database; a member's terminal receiving the self-expression index and transmitting the self-expression index to the interface server through the network; and a manager's terminal requesting and receiving the self-expression index from the interface server through the network to display or output the self-expression index, wherein the self-expression index may include a first index including one or more of avatar expression changing according to a state where any one of two or more icon shapes present in the member's terminal in correspondence to a degree of psychology or feeling of the member, a color changing according to a state where any one of two or more colors preset in the member's terminal, and an index including an input point of points preset in the member's terminal, and a second index formed of a language element input to the member's terminal in correspondence to the degree of psychology or feeling of the member, the interface server may include a self-expression index statistics generation module to store the generated self-expression index statistics in the database, and the manager's terminal requests and receives from the internet server the self-expression index statistics during a predetermined period through the network to display or output the self-expression index statistics, the self-expression index statistics may include change details in the first and second indexes during the predetermined period, and the manager's terminal displays or outputs statistics of the first index input in correspondence to an input of the second index with respect to the second index input during the determined period preset in the manager's terminal.

The second index may be selected from among a language element group displayed during the predetermined period on the member's terminal and input.

The statistics of the first index may be the number of the avatar expression or color times, or an accumulated or average of the point.

The group member management support system may further include an observer's terminal receiving the self-expression index statistics or item process statistics.

According to another aspect of the present invention, a group member management support method includes: (a) receiving, by a member's terminal, a self-expression index including expression of the avatar, which changes according to a state where any one of two or more icon shapes preset in the member's terminal is input in correspondence to a degree of psychology or feeling of a member, and an input point of points preset in the member's terminal, and transmitting the self-expression index to the interface server; (b) storing, by the interface server, the self-expression index in the database, and generating statistics for the self-expression index including change details in the avatar expression and point during a predetermined period to store in the database, and generating a virtual compensation item to store in the database; (c) requesting and receiving, by the manager's terminal, the self-expression index, the self-expression statistics, and the item from the interface server during a predetermined period; (d) transmitting, by the manager's terminal, the item to an arbitrary member's terminal; and (e) transmitting, by the member's terminal, the received item to another member's terminal, wherein when receiving the self-expression index statistics included in a range of the number of specific avatar expression times during a predetermined period and a point range preset in the manager's terminal, the manager's terminal displays or outputs a notification about who is a corresponding member.

The group member management support method may further include generating, by the interface server, statistics for the item process to store the statistics in the database, and operation (c) may further include requesting and receiving, by the manager's terminal, the item process statistics from the interface server, the item process statistics may include change details in the number of item transmission and reception times for each member during the predetermined period, and the manager's terminal may display or output a flowchart of item exchanges between members during the predetermined period, and when receiving the item process statistics included in a range of the number of item reception times or a range of the number of possessed items during the predetermined period preset in the manager's terminal, may display or output the notification about who is the corresponding member.

The group member management support method may further include (f) transmitting, by the manager's terminal, the self-expression index statistics or item process statistics to an observer's terminal.

According to another aspect of the present invention, a computer readable medium has a program recorded thereon, which performs the above-described method.

According to the present invention, there is an effect of providing a system and method capable of easily and efficiently supporting group member management in a computerized method by using a pre-constructed network and using a database, interface server, terminal, and the like that process a self-expression index representing psychology or feeling of each group member.

In addition, there is an effect of enabling counseling and psychological treatment for members belonging to a risk group in a school life to be smoothly proceeded by checking from a manager terminal a transmission result of self-expression index statistics and compensation items and transmitting the result to an observer's terminal and accordingly allowing friend relations between members to be easily figured out and a psychological state and friend relations of members to be effectively shared by a manager and observer.

In addition, there is also an effect capable of easily figuring out psychology or feeling of each group member or using as a counseling document through a language used by each member by matching a subjectively expressed language element with a corresponding index, and statistically processing the matched result to use a language element, which is difficult to quantify as a relative self-expression index for each member in correspondence to the psychology or feeling, together with an index that is a self-expression index showing psychology and feeling of each group member, which enables the psychology or feeling to be objectively figured out.

BRIEF DESCRIPTION OF THE DRAWINGS

FIGS. 2A to 4 are views of a self-expression index input screen displayed on a member's terminal according to an embodiment of the present invention.

FIGS. 7 to 8A exemplarily illustrate screens displaying a statistical index in a manager's terminal according to the present invention.

DETAILED DESCRIPTION

Figure 1:
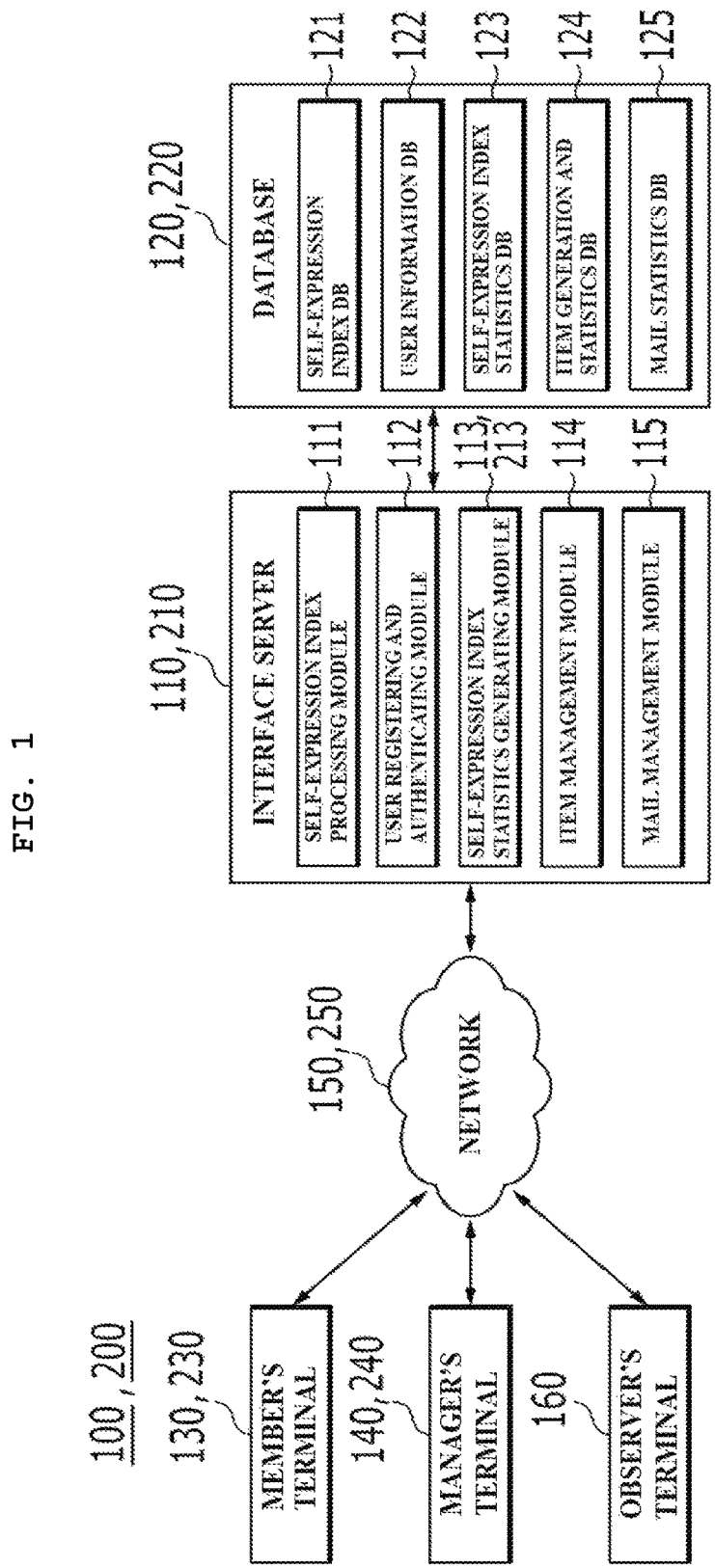
FIG. 1 is a view schematically illustrating a configuration diagram of a system for supporting group member management.

Hereinafter, embodiments of the present invention will be described in detail with reference to the accompanying drawings. In describing the present invention, a detailed description of known technology will be omitted when it may obscure the subject matter of the present invention. In the drawings, parts which are not related to the description are omitted to clearly set forth the present invention and similar elements are denoted by similar reference symbols throughout the specification. In addition, when an element is referred to as "comprising" or "including" a component, it does not preclude another component but may further include the other component unless the context clearly indicates otherwise.

Group Member Management Support System

FIG. 1 is a view schematically illustrating a configuration diagram of a system for supporting group member management.

As illustrated in FIG. 1, the group member management support system 100 according to the present invention basically includes an interface server 110, a database 120, a member's terminal 130, and a manager terminal 140. Hereinafter, a detailed description will be provided about the configuration.

The interface server 110 is connected to a network 150 and configured to be remotely accessible by a user such as a member or manager. Accordingly, as illustrated in FIGS. 2 to 4, a member may input a self-expression index by using a terminal 130 on which a web site or the like provided by the internet server 110 through the network 150 is displayed, and the interface server 110 may store the self-expression index input from the member's terminal 130 in the database 120 as an item of self-expression index DB 121. The self-expression index data may be processed by a self-expression index processing module 111 in the interface server 110.

The self-expression index in the present invention is an index representing a degree of psychology or feeling of each group member and may be displayed in various methods. In the present invention, for frequent accessibility and interest induction of young students to an electronic device together with induction to smooth communication with a teacher, as illustrated in FIG. 2, the self-expression index may be displayed to allow expression of an avatar 132 to be changed according to selection (touch) (FIG. 2A) of an icon shape 131 having various kinds of preset expressions in correspondence to the degree of psychology or feeling on a screen of the member's terminal 130. As illustrated in FIG. 3, in a color wheel 133 showing preset various colors on a screen of the member's terminal 130, the self-expression index may be displayed to allow a selected color to be shown (FIG. 3B) in a color unit 132a displayed on a portion (body part of avatar in FIG. 3) other than avatar's expression by selecting (touching) (FIG. 3A) the color which may expresses current psychology or feeling. In addition, as illustrated in FIG. 4, the self-expression index may be displayed on the screen of the member's terminal 130 by selecting (touching) a point expressible current psychology or feeling in a preset point board or point gauge 134.

At this point, as a preferred example, the icon shape 131 having preset various kinds of expressions may be displayed around an expression region of the avatar 132 displayed on the member's terminal, and may be realized so that expression of the avatar 132 is changed according to the selection (touch) of a specific icon shape 131 of a member. In addition, in a similar manner, when the color wheel 133 in which various colors are deployed around the color unit 132a, a color of the color unit 132a may be realized to be changed according to selection (touch) of a specific color by a member.

In detail, a self-expression index input may be performed through the member terminal 130 by using the avatar 132 shown in an initial screen on the member terminal 130, an avatar selecting unit 131, a color wheel 133, and a point board or point gauge 134. When the avatar selecting unit 131 is displayed in the initial screen around the expression (face) of the avatar 132, one icon of the avatar selecting unit 131 is selected to allow the avatar 132 to have corresponding expression and allow the avatar selecting unit 131 to disappear from the screen (see FIG. 2). When the color wheel 132 is displayed around the color unit 132a of the avatar, one color in the color wheel 133 is selected to allow the color unit 132a of the avatar to be changed to a corresponding color and allow the color wheel 133 to disappear from the screen (see FIG. 3). In addition, when a point input request signal appears around the point board 134 a specific point may be selected, the history of the selected point may not particularly appear on the member's terminal 130 but appear only on the manager's terminal 140, and a specific part (e.g., color unit) of the avatar is shown in the screen in a size proportional to the point.

In the present invention, the network 150 may mean, typically, the internet, but another network is also possible which includes, for example, a local area network (LAN), wide area network (WAN), public switched telephone network (PSTN), public switched data network (PSDN), cable TV network, wireless communication network, and the like. The member may access the interface server 110 through the member's terminal 130 such as a computer or mobile device (smartphone, tablet PC, or the like), and input to transmit (by using a save button on the screen) the self-expression index to be stored in the database 120.

In addition, the interface for receiving the self-expression index, which is provided by the interface server 110 to the member, may be typically, but not limited to, a web site through a web browser or an application installed in the computer or mobile terminal, and a type thereof is not limited, when assumed that the self-expression index is received from a member and transmitted to the interface server through a network.

The interface server 110 receiving the self-expression index from the member's terminal 130 may update the database 120 periodically or in real time, and through this process, may store the self-expression index in the database 120 or amend it according to an external request.

Figure 5:
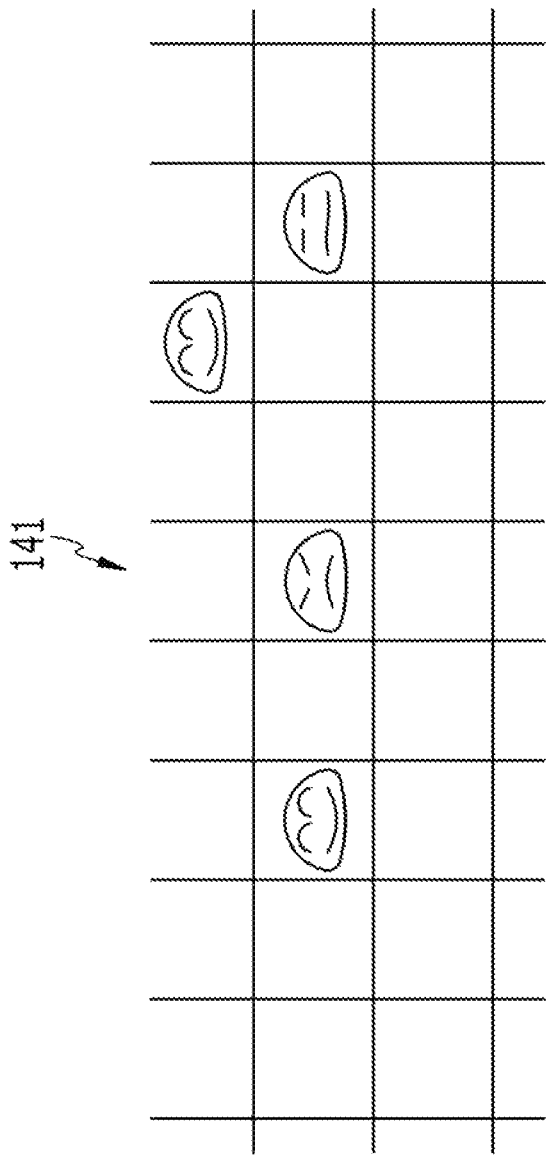
FIG. 5 is a view illustrating a self-expression index check board displayed on a manager's terminal according to an embodiment of the present invention.
Figure 6A:
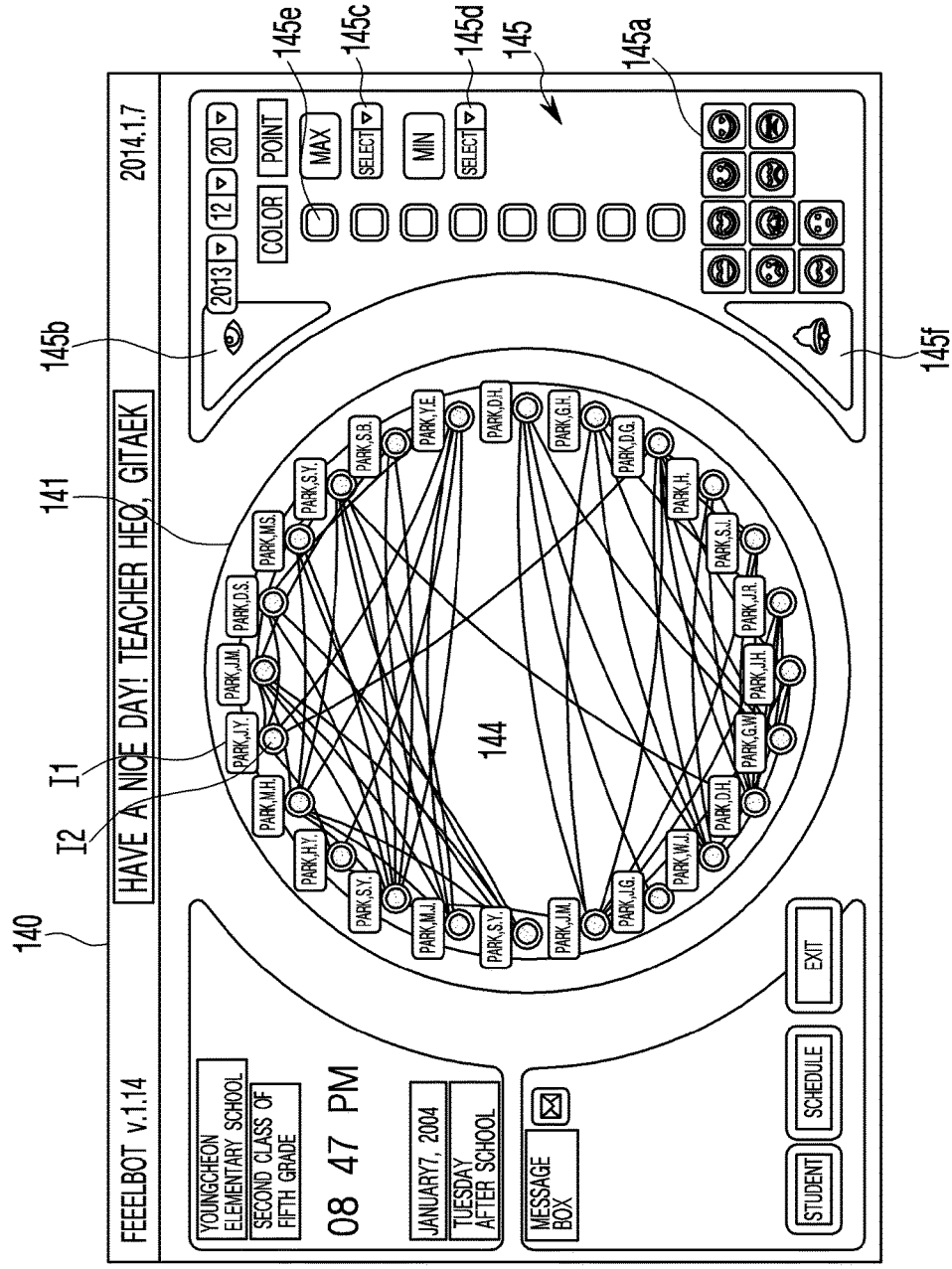
FIGS. 6A-6E exemplarily illustrates a screen displayed on a manager's terminal according to the present invention.

In the present invention, the manager's terminal 140 may request and receive the self-expression index from the interface server 110 through the network to display or output the self-expression index on the manager's terminal, namely, may receive the self-expression indexes from the self-expression index DB 121, which has transmitted by each member through the interface server 110, to allow the self-expression indexes for all the members belonging to a corresponding group to be read. For example, when the manager's terminal 140 requests the self-expression index from the interface server 110, as illustrated in FIGS. 5 and 6A, content of the self-expression index for a member having transmitted the self-expression index may be checked from a self-expression index check board 141 divided by a member's name and pre-displayed on the screen of the manager's terminal 140. The manager's terminal 140 accesses the interface server 110 through the computer or mobile device (e.g., smartphone, tablet PC, or the like) similar to the member's terminal 130, and receives to read the self-expression index (by using automatic update or a request button on the terminal screen).

A manager, for example, a class teacher managing students belonging to a specific class in a school may check at one view psychology or feeling of an individual student from expression of the avatar 132 on the screen of the manager's terminal 14 receiving the self-expression index. In addition, the psychology or feeling of the student may be indirectly checked from the color of the color unit 132a of the avatar, and from a size or point gauge of a specific part (e.g., color unit) in which current psychology or feeling input as a point is shown in proportional to the point.

Figure 6B:
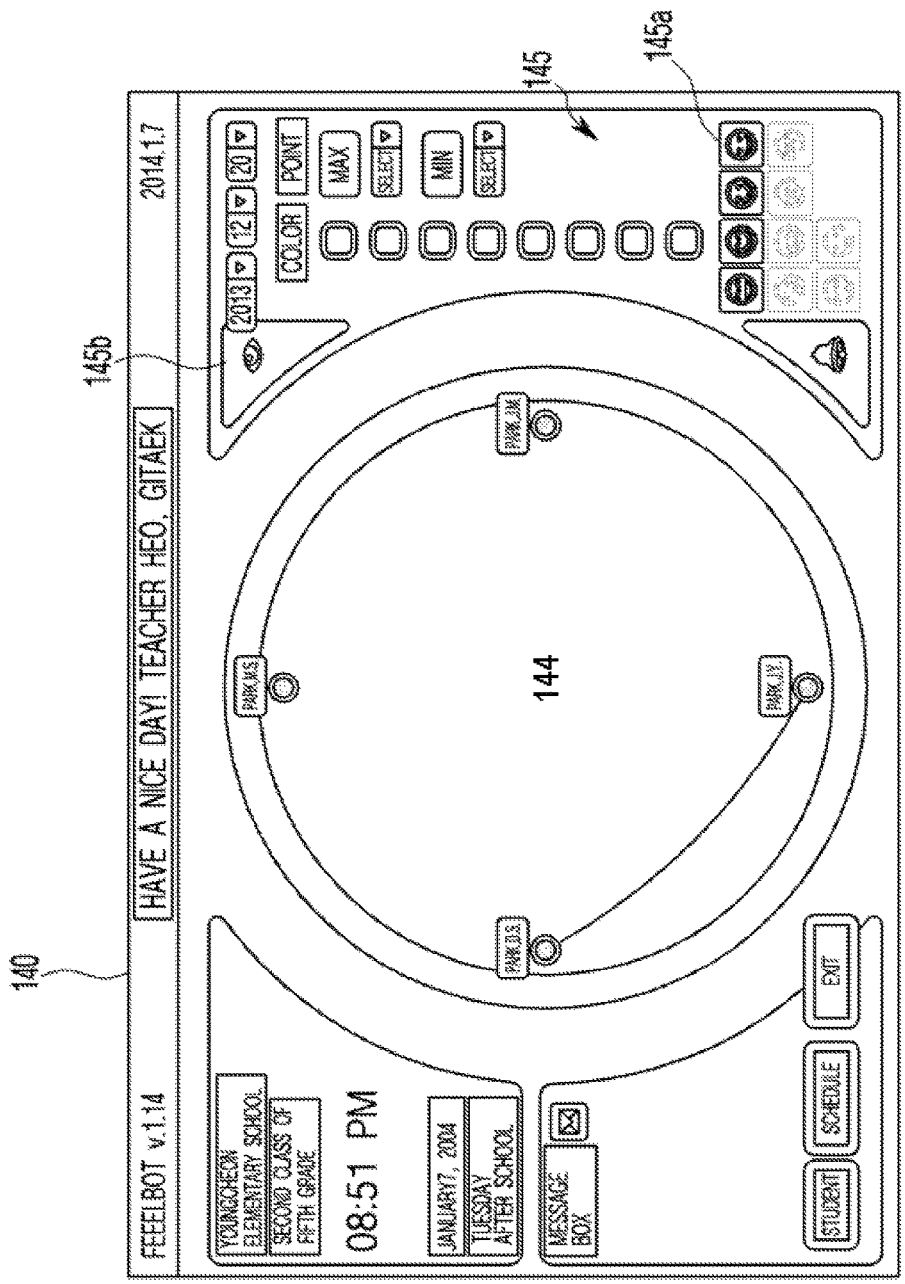
Figure 6C:
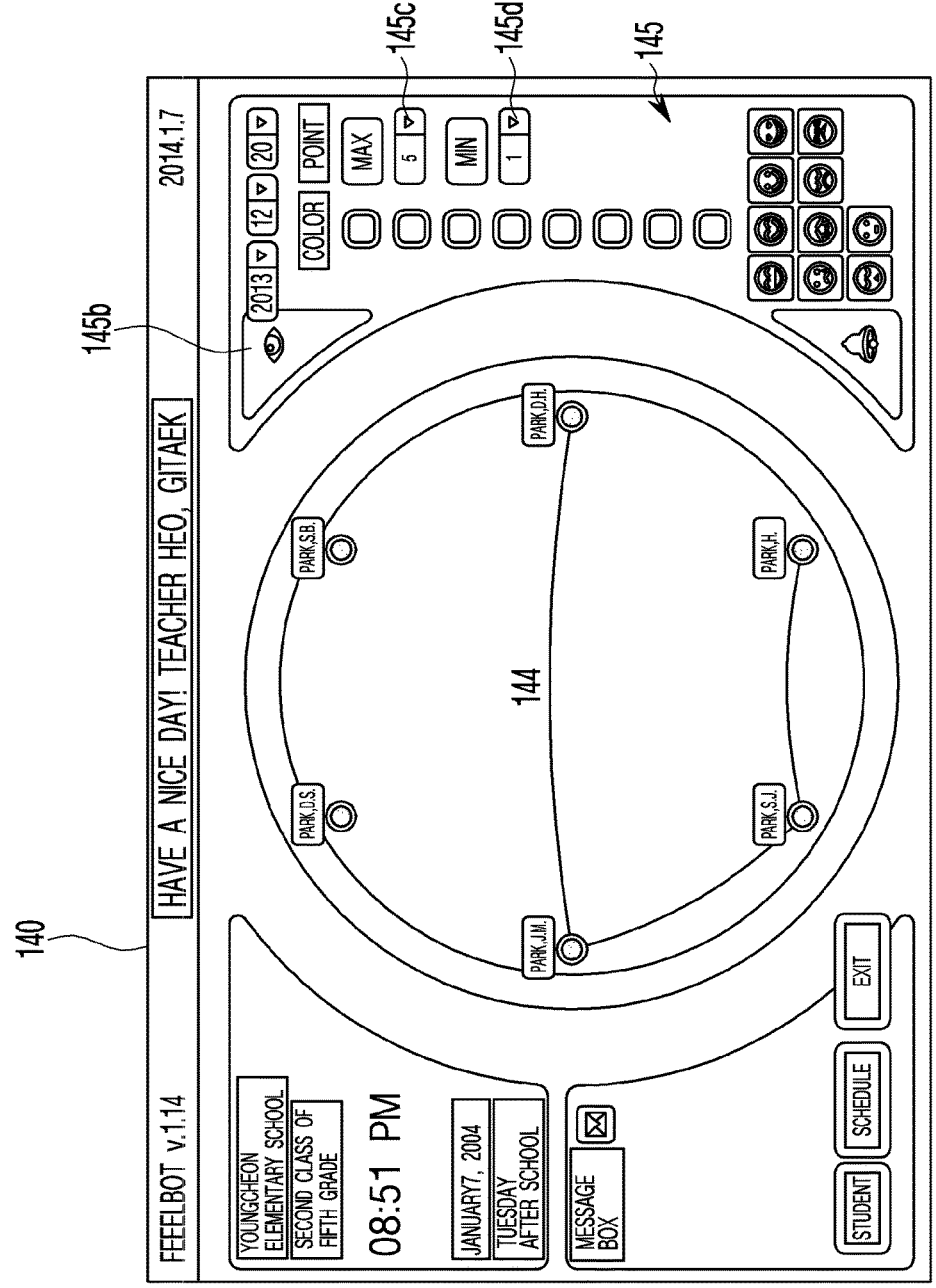
Figure 6D:
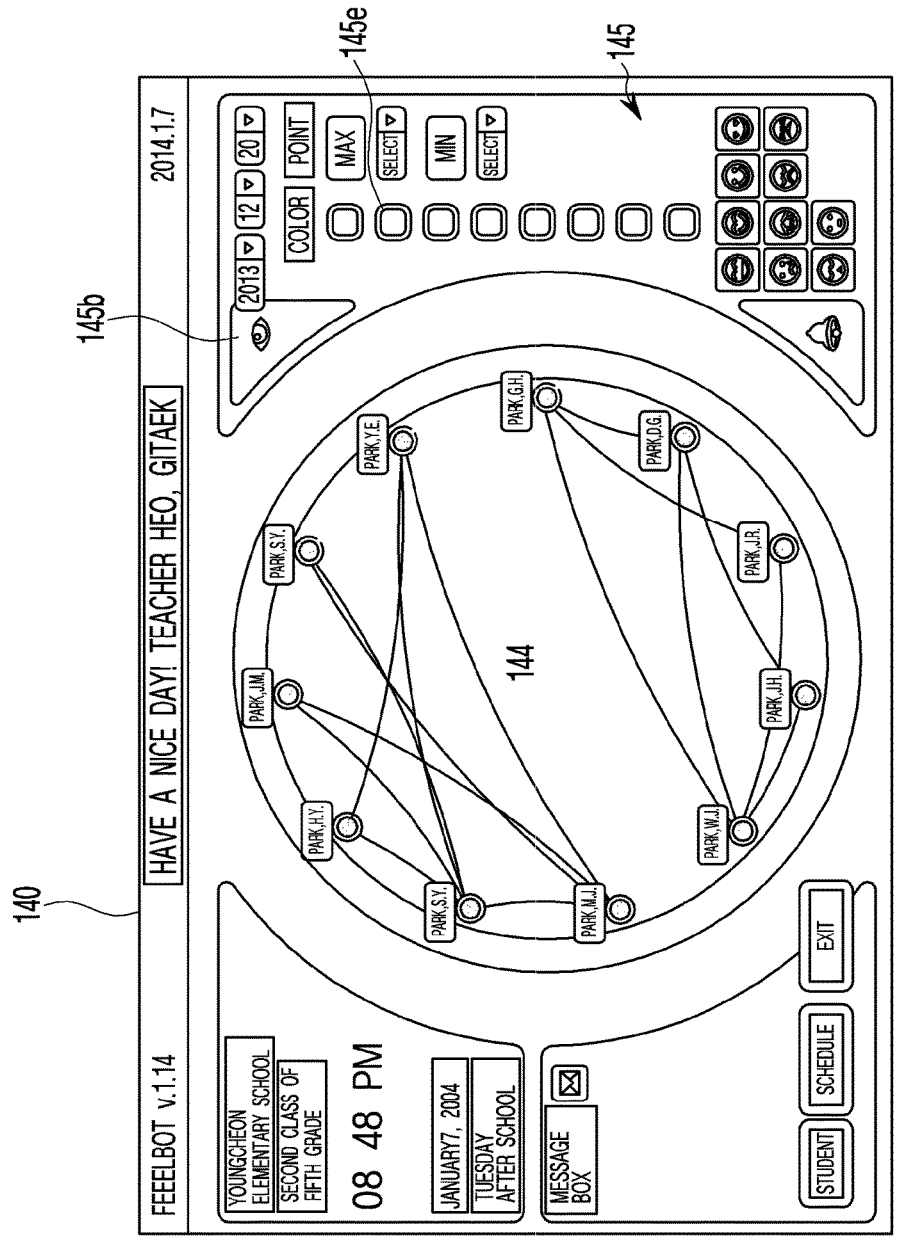
Figure 6E:
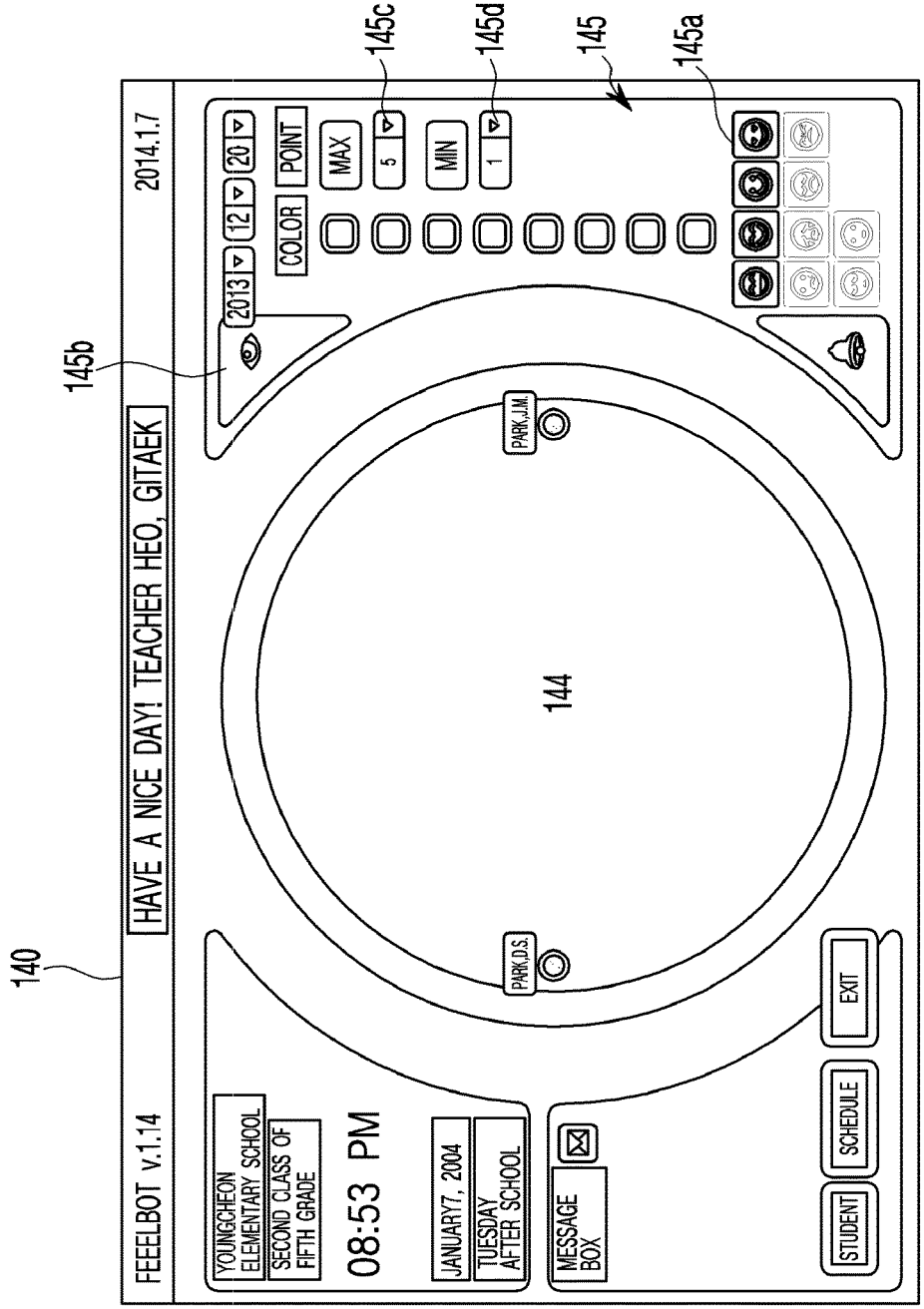

Furthermore, referring to FIG. 6A, the screen of the manager's terminal 140 may be realized to display a filter unit 145 and allow only a corresponding member to be shown by selecting a specific self-expression index. For example, when an icon of frown or sad expression is mainly selected from among the avatar expressions 145a and a filtering button 145b is touched, only a member having transmitted corresponding avatar expression is displayed (FIG. 6B). When a point range is selected by using a maximum point button 145c and minimum point button 145d, and the filtering button 145b is touched, only a member having transmitted a point in a corresponding point range is displayed (FIG. 6D). When the point range is selected by using the maximum point button 145c, minimum point button 145d, and an icon 145a of a specific expression is selected, and the filtering button 145b is touched, only a member having transmitted the avatar expression corresponding to a point of a corresponding range may be displayed (FIG. 6E).

In the present invention, the database 120 is connected to the interface server 110 to store in the self-expression index DB 121 the self-expression index received from the member's terminal 130 through the interface server 110. Accordingly, when receiving a request for the self-expression index from the manager's terminal 140, the database 120 transmits the self-expression index to the manager's terminal 140 in response to the request.

Before an input of self-expression index by a group member and a check for self-expression index by the manager, a means for registering and authenticating the member is considered for an access of the member to an interface environment. To this end, in the present invention, a user registering and authenticating module 112 is provided in the interface server 110 and receives personal information on each member from the member's terminal 130. The member's terminal 130 transmits information received through the network 150, the user registering and authenticating module 112 in the interface server 110 receives the member's personal information through the network 150 to store it in a user information DB 122 of the database 120. Thereafter, the user registering and authenticating module 112 requests an authentication process from the manager's terminal 140 through the user information DB 122, and the manager's terminal 140 transmits an authentication result to the user registering and authenticating module 112 to allow the member to access the interface environment.

In the present invention, the interface server 110 includes a self-expression index statistics generating module 113 together with a self-expression index processing module 111. The self-expression index statistics generating module 113 may generate statistics of changes in all the self-expression indexes having been input and transmitted from each member's terminal 130, and store the statistics in the self-expression index statistics DB 123 of the database 120.

Figure 7:
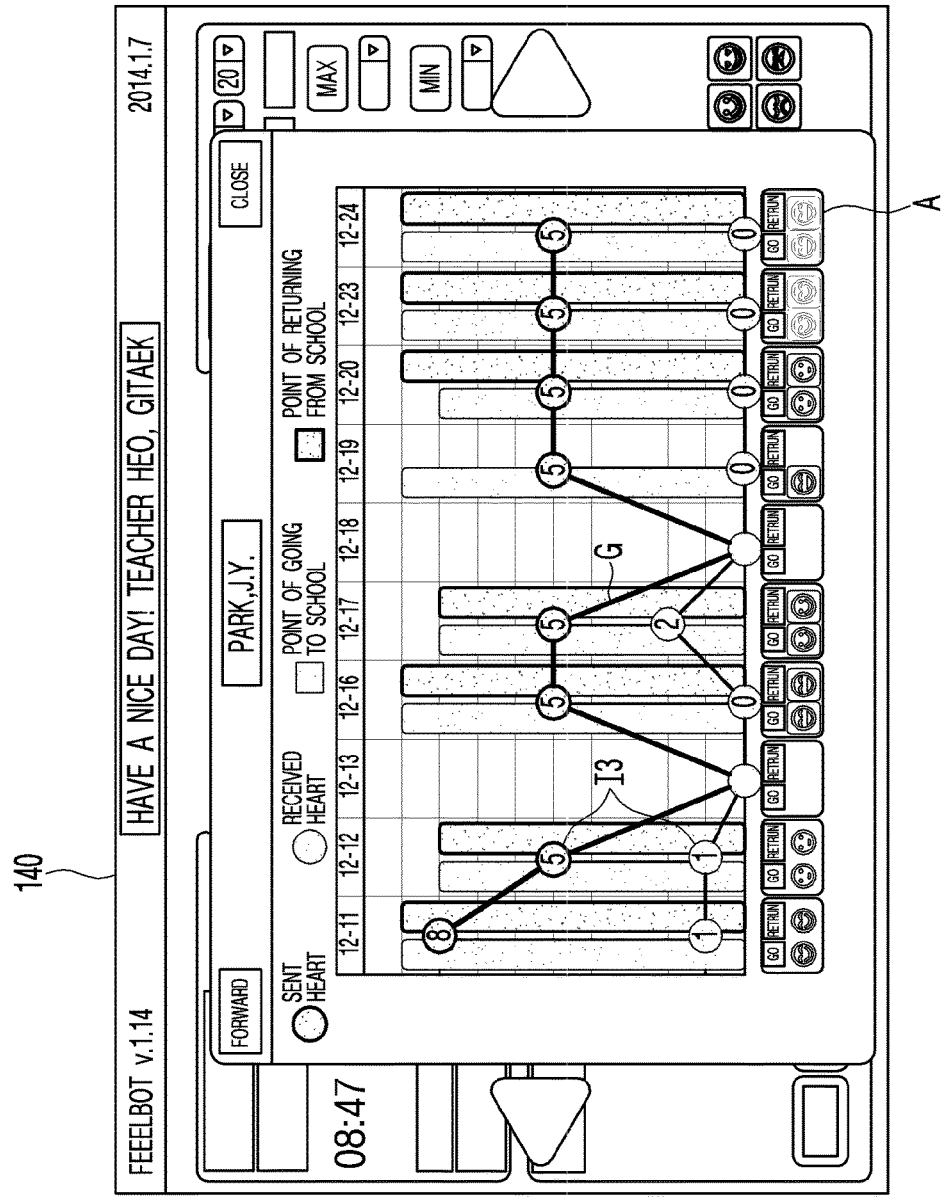

The self-expression index statistics generating module 113 may generate various statistics indexes such as representable graphs including, for example, as illustrated in FIG. 7, change details A in avatar expression during a predetermined period, change details (see the bar graph for each date in the drawing) in point, and change details A in color. In FIG. 7, change details for 10 days are illustrated, and for the avatar expression, psychology and feeling change details in a day for each member may be checked from data statistics input at the time of going to school and returning from school. In addition, as illustrated in FIG. 8A, the self-expression index statistics generation module 113 may also generate a statistics index including a graph E representable the number of times C for avatar expression during a predetermined period B, the number of times D of a specific color of the color unit 132a, and a point average together with change details thereof.

The manager terminal 140 may request and receive from the interface server 110 self-expression index statistics during a predetermined period through the network 150, and display or output various self-expression index statistics by selecting (touching) icon 11 displayed for each member on the screen of the manager's terminal 140. Accordingly, the manager may figure out at one view a recent psychology or feeling state together with a degree of change thereof for each corresponding group member.

Figure 8B:
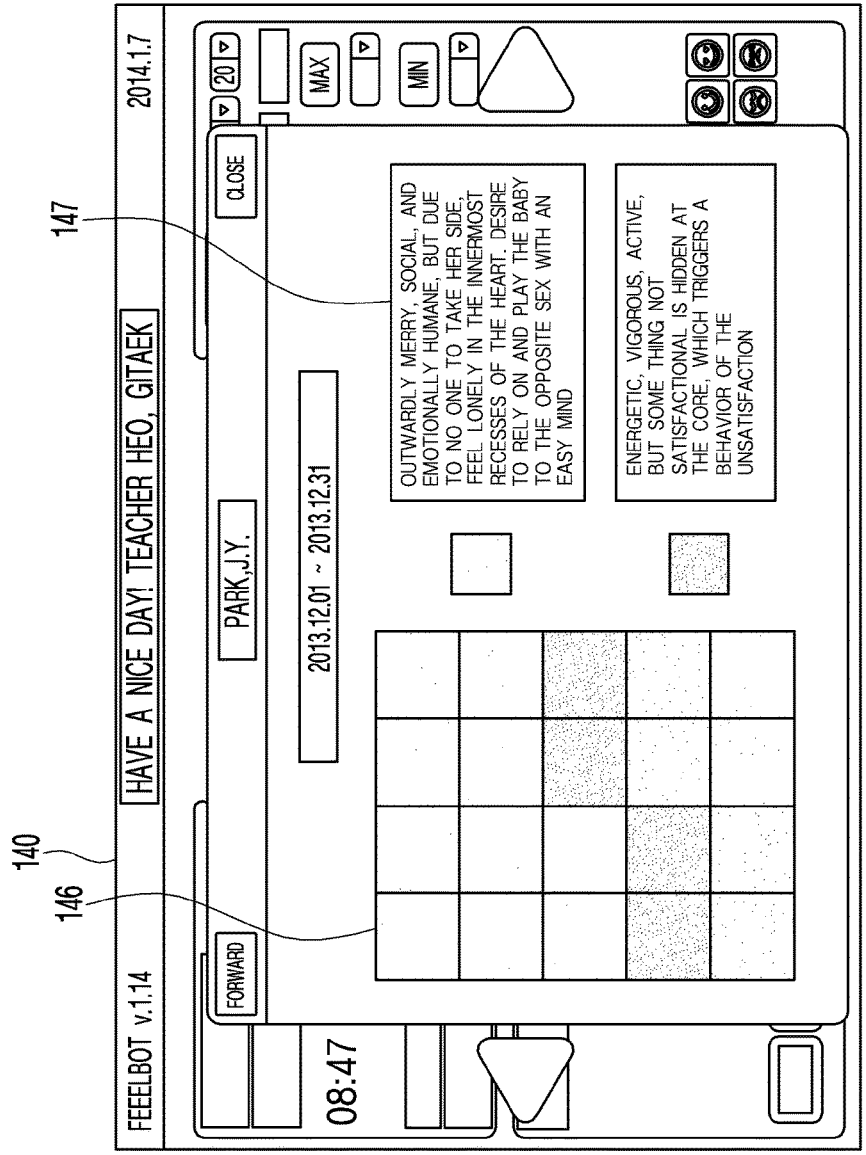
FIG. 8B exemplarily illustrates a screen displaying psychological state information using color statistics in a manager's terminal according to the present invention.

Furthermore, a means may be considered for providing psychological state information on a member by using the self-expression index statistics related to the number of a specific color. FIG. 8B exemplarily illustrates a screen displaying psychological state information using color statistics in a manager's terminal according to the present invention.

Referring to FIG. 8B, the self-expression index statistics generating module 113 enables the psychological state information to be displayed on the manager's terminal 140 by using a color plate 146 in which the number of times for each color is compared and represented on the basis of data of the number of times for each color during a predetermined period, and displays the psychological state information 147 for each color to allow the manager or an observer to indirectly figuring out recent psychological state of a corresponding member.

Figure 9:
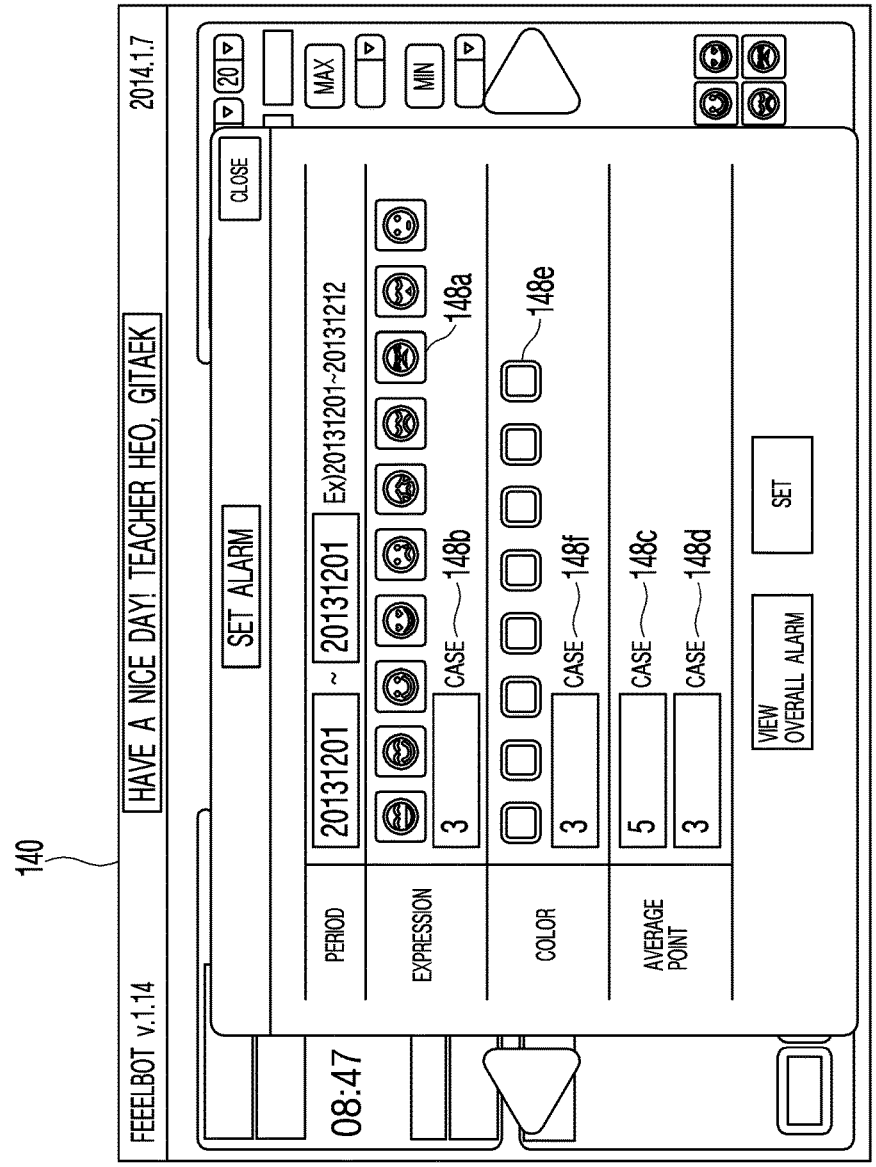
FIG. 9 is a view illustrating a notification function setting screen displayed on a manager's terminal according to an embodiment of the present invention.

FIG. 9 is a view illustrating a notification function setting screen displayed on a manager's terminal according to an embodiment of the present invention.

Referring to FIG. 9, in the present invention, the manager's terminal 140 includes a notification function for displaying or outputting who is a corresponding member, when receiving self-expression index statistics included in a range of the number of times of specific avatar expression preset therein during a predetermined period or in a point range preset therein.

Figure 10:
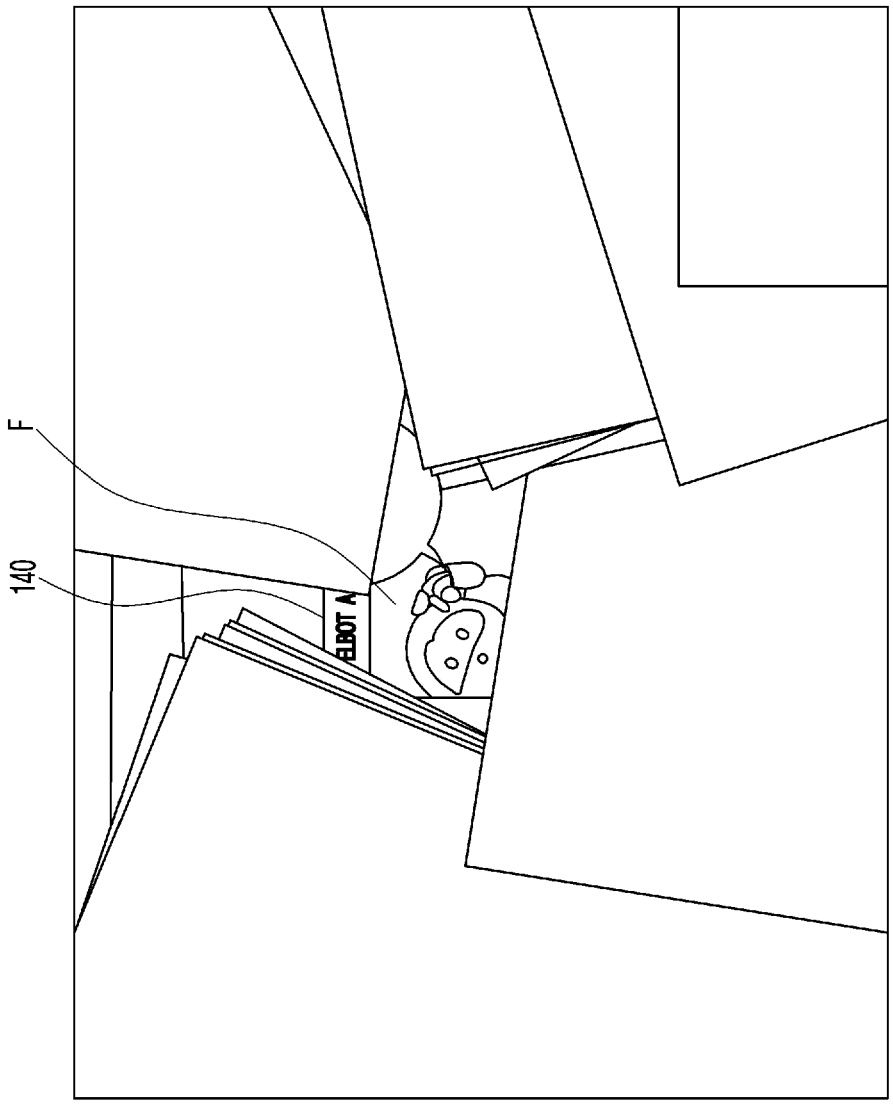
FIG. 10 is a view illustrating that a notification function is realized according to the present invention.

For example, when a notification setting button (see 145f of FIG. 6A) of the manager's terminal 140 is touched, a notification function setting screen is displayed. When an icon of frown or sad expression is mainly selected in the avatar expression 148a, and the range of the number of times 148b, an average point range 148c during a predetermined period, and the range of the number of times 148d are set, and the self-expression index statistics included in the range of the number of times of the avatar or the range of the number of times of a corresponding point is received, as illustrated in FIG. 10, notification for who is the corresponding member is displayed (F) or output. In the same manner, a color through which depressed feeling is mainly represented may be selected from among colors 148e displayed on the notification function setting screen, a range of the number of times 148f may be set, or a range (not illustrated) of a point summed value during a predetermined period may also be set. Accordingly, the manager may easily figure out a member belonging to a risk group in real time.

In the present invention, the interface server 110 may further include an item management module 114. The item management module 114 is a module for generating and processing a virtual compensation item. The item information generated and processed by the interface server 110 is stored in the item generation and statistics DB 124 of the database 120. The manager's terminal 140 requests and receives an item from the interface server 110 through the network 150, and then transmits the item to an arbitrary member's terminal 130 through the network 150. In addition, the member's terminal 130 receiving the item may retransmit the item to another member's terminal 130.

Figure 11:
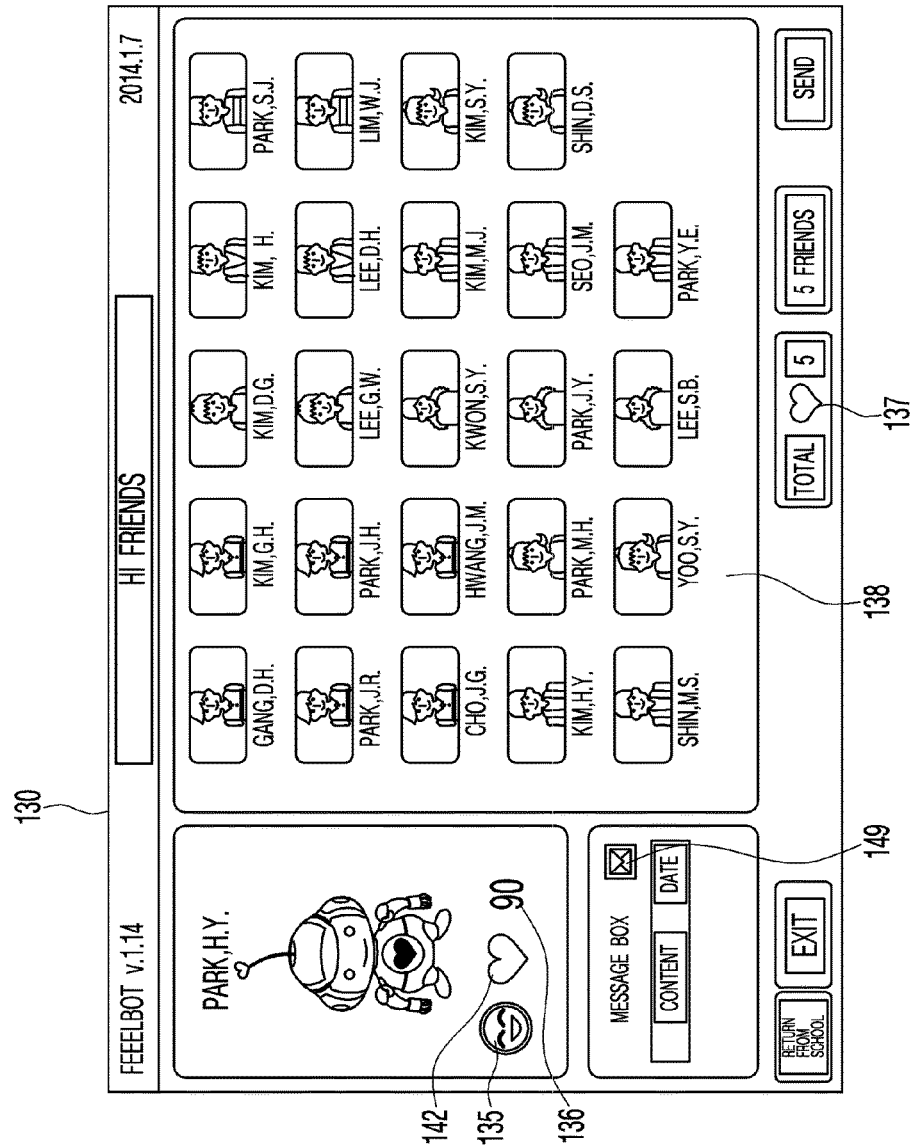
FIG. 11 exemplarily illustrates a screen displayed on a member's terminal according to the present invention.

In the present invention, the item 142 may be, as virtual compensation, a virtual present, for example, a virtual present 142 such as a heart illustrated in FIG. 11, which is that a manager, for example, a class teacher managing students belonging to a specific class in a school transmits to a specific student. The manager may transmit by selecting the present item 142 from a pre-displayed present box on the screen (not illustrated) of the manager's terminal 140, selecting an entirety of or a portion of students to be shown in a student list, and selecting the number of the present items 142.

The member's terminal 130 receiving the item from the manager's terminal 140, as illustrated in FIG. 11, may display the avatar expression 135 representing current psychology or feeling, the number 136 of currently possessed items, and the number of re-transmittable items 137, and select from a re-transmittable range (5 in FIG. 11) one or more of icons displaying other members to which the present item is to be retransmitted, and retransmit (by touching a 'send' button in the drawing) the icon(s).

At this point, the interface server 110 in the present invention may calculate statistics for the item 142 processed by the item managing module 114, and store the calculated item process statistics in the item generation and statistics DB 124 of the database. The manager terminal 140 may request and receive the item process statistics from the interface server 110 through the network 150, and display or output the item process statistics.

Figure 12:
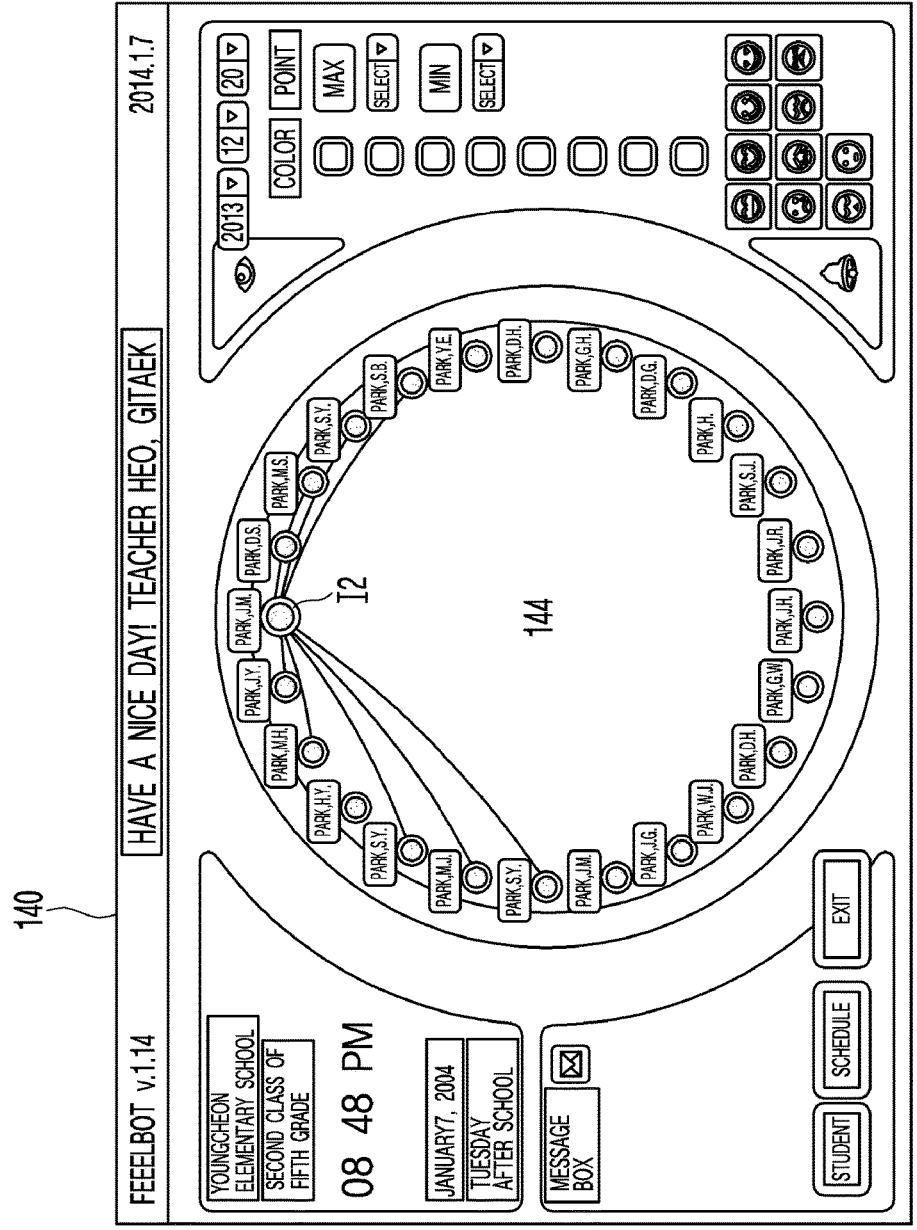
FIGS. 12 and 13 exemplarily illustrate screens displayed on a manager's terminal according to the present invention.

Accordingly, as illustrated in FIG. 6, the manager may check a present exchange flowchart 144 between members on the manager's terminal 140. For example, FIG. 6 illustrates a display of a present exchange flowchart 144 between members for the entire members in a corresponding group. As illustrated in FIG. 12, the item exchange flowchart 144 between members selected according to a selection of an icon 12 symbolizing the self-expression index for each member, which is displayed on the manager's terminal 140. Here, as illustrated, colors of exchange flow lines may be differently displayed in order to distinguish item transmission, item reception, and item exchange from each other. In FIG. 12, a red flow line, blue flow line, and green flow line respectively represent item transmission, item reception, and item exchange. Furthermore, FIG. 12 illustrates a case where one icon 12 is selected, and two or more icons 12 are selected and an item exchange flow may be checked between members.

Accordingly, a class teacher managing students belonging a specific class of a school may check flows of present transmission results between students at one view and easily figure out friend relations between students, and a student belonging to a risk group may be closely figured out through whether there is an outcast student and whether there is a case where friend relations are disconnected between specific students.

Here, according to a preferred embodiment of the present invention, the item management module 114 may generate statistics of change details in the number of item transmission and reception times for each member during a predetermined period and store this in the item generation and statistics DB 124 of the database 120. Accordingly, the manager terminal 140 may request and receive from the interface server 110 item processing statistics during a predetermined period through the network 150, and as illustrated in FIG. 7, display or output change details G in the number of item transmission and reception times by selecting (touching) an icon 11 displayed for each member on the screen of the manager's terminal 140. Accordingly, the manager may figure out whether active friend relations are continued for each corresponding group member.

Figure 13:
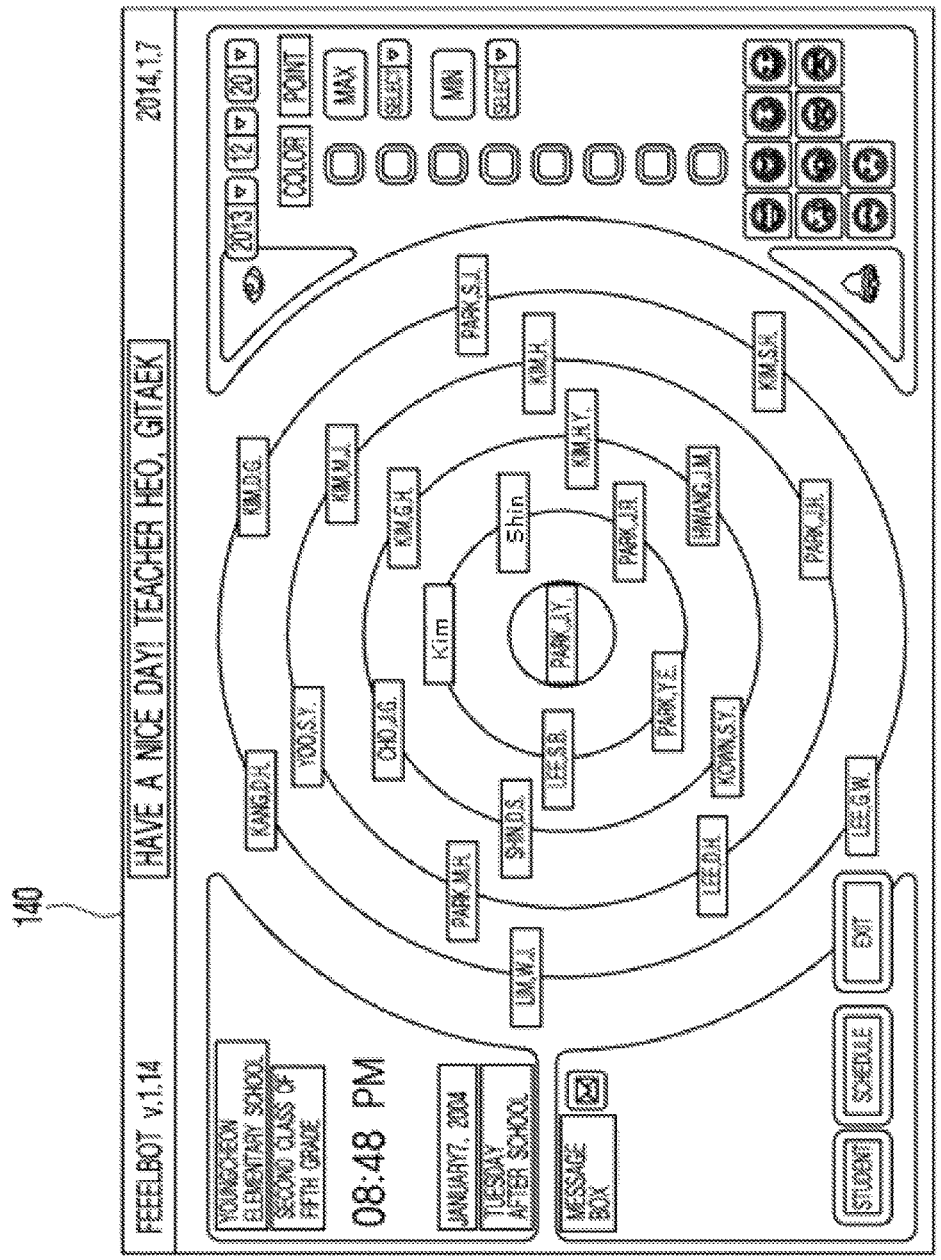

In addition, the manager terminal 140 may request and receive from the interface server 110 item processing statistics during a predetermined period through the network 150, and as illustrated in FIG. 13, display or output other members in an order of the large number of item transmission and reception times by selecting (touching) a separately displayed icon (not illustrated) on the screen of the manager's terminal 140. For example, when an icon and transmission button (not illustrated) displayed on a specific member is selected, other members to whom a corresponding member transmits items are shown in an order of the large number of item transmission times. When an icon and transmission/reception button (not illustrated) displayed for a specific member is selected, other members may be shown in an order of the large number of item exchanging times with the corresponding member. Accordingly, the manager may figure out at one view entire friend relations with group members for each corresponding group member.

Furthermore, similar to a description in relation to FIG. 9, a notification function may be provided. For example, when then item processing statistics included in the range of the number of item reception times or a range of the number of item possessions preset in the manager's terminal 140 during a predetermined period, a notification about who is a corresponding member is displayed (see FIG. 10) or output and then a member belonging to a risk group that active friend relations are not continued may be easily figured out in real time.

In the present invention, the interface server 110 may further include a mail management module 115. The mail management module 115 is a module for processing mails 149 transmitted/received between members and between members and a manager. The mail transmission/reception information processed by the interface server 110 may be stored in a mail statistics DB 125 of the database 120, and the manager's terminal 140 may request and receive mail transmission/reception statistics between members from the interface server 110 through the network 150.

At this point, the interface server 110 may calculate statistics for the mail statistics processed by the mail management module 115, and store the calculated mail statistics in the mail statistics DB 125 of the database. The manager's terminal 140 may request and receive the mail statistics from the interface server 110 through the network 150, and display or output the mail statistics.

The mail statistics includes the number of mail transmission/reception times between members during a predetermined period, and the manager's terminal may check mail exchange flows similarly to the present exchange flow chart (see FIG. 6) between the members by displaying or outputting the number of mail transmission/reception times between members during the predetermined period. For example, similarly to FIG. 6, the mail exchange flows between members are displayed for the entire members of a corresponding group, and similarly to FIG. 12, mail exchange flows between members selected according to icon selection symbolizing self-expression index for each member displayed on the manager's terminal 140. In addition, as illustrated, colors of exchange flow lines may be differently displayed in order to distinguish mail transmission, mail reception, and mail exchange from each other.

Here, according to a preferred embodiment of the present invention, the mail management module 115 may generate statistics of change details in the number of mail transmission and reception times for each member during a predetermined period and store it in the mail generation and statistics DB 125 of the database 120. Accordingly, the manager terminal 140 may request and receiver from the interface server 110 mail process statistics during a predetermined period through the network 150, and as illustrated in FIG. 7, display or output the change details in the number of mail transmission and reception times by selecting (touching) an icon displayed for each member on the screen of the manager's terminal 140. In addition, the manager terminal 140 may request and receive from the interface server 110 mail statistics during a predetermined period through the network 150, and as illustrated in FIG. 13, display or output other members in an order of the number of mail transmission and reception times by selecting (touching) a separately displayed icon on the screen of the manager's terminal 140.

Figure 14:
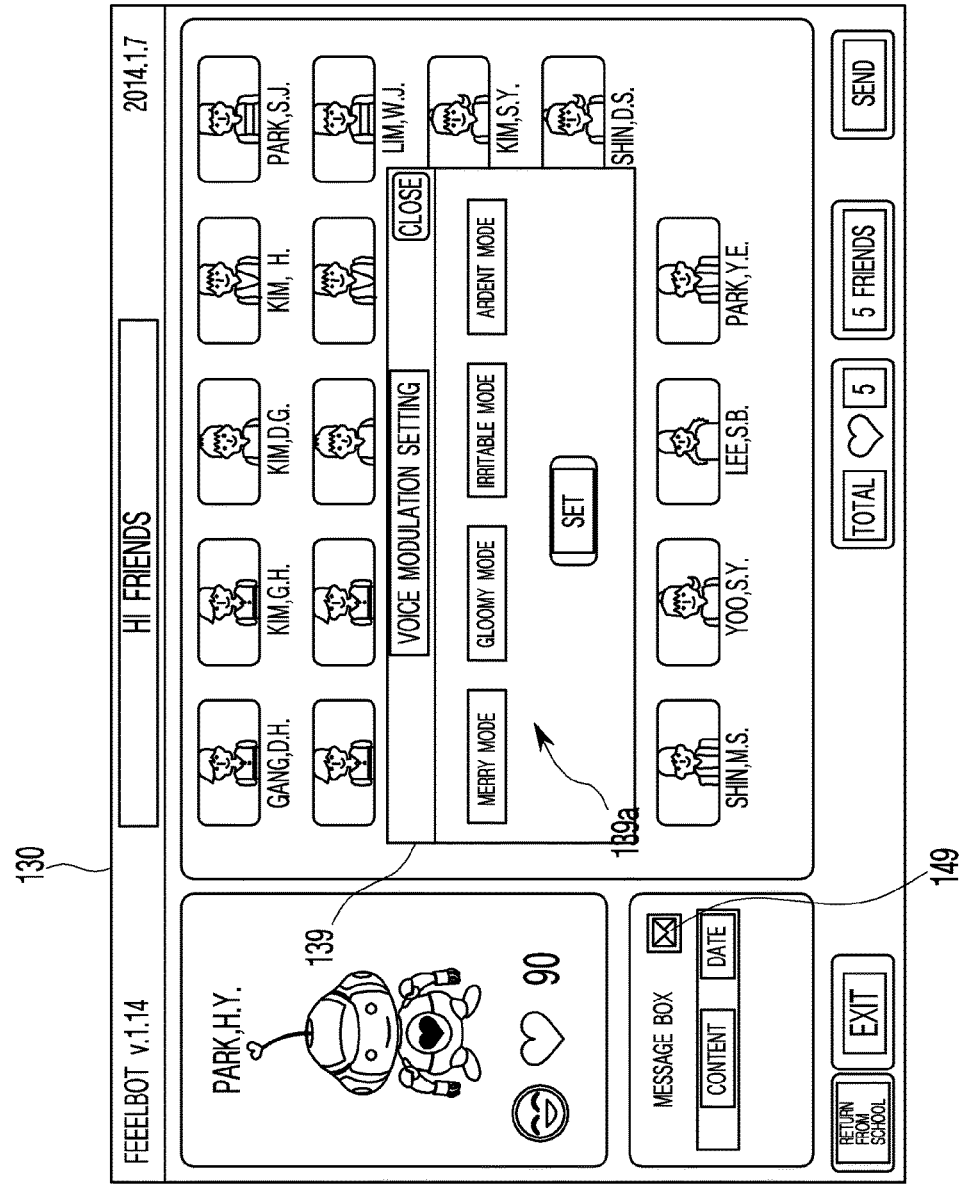
FIG. 14 exemplarily illustrates a voice modulation setting mode in a member's terminal according to the present invention.

In the present invention, the mail may include a voice mail. At this point, each member's terminal includes a voice modulation setting mode 139 through which a specific voice mode may be selected at the time of transmitting a voice mail, and transmits a voice mail with voice modulated according to psychology or feeling of the member, and accordingly the manager may more accurately check a psychology or feeling state of the member from the modulated voice of the member. For example, as illustrated in FIG. 14, the voice modulation setting mode 139 is a specific voice mode and includes various modulation modes 139a such as a merry mode, gloomy mode, irritable mode, and ardent mode in which a mail is transmitted with the modulated voice capable of representing psychology or feeling of the member according to mode selection after recording in a normal voice. A voice mail including such a voice modulation setting mode 139 may be realized by employing a known voice modulating means.

Figure 15:
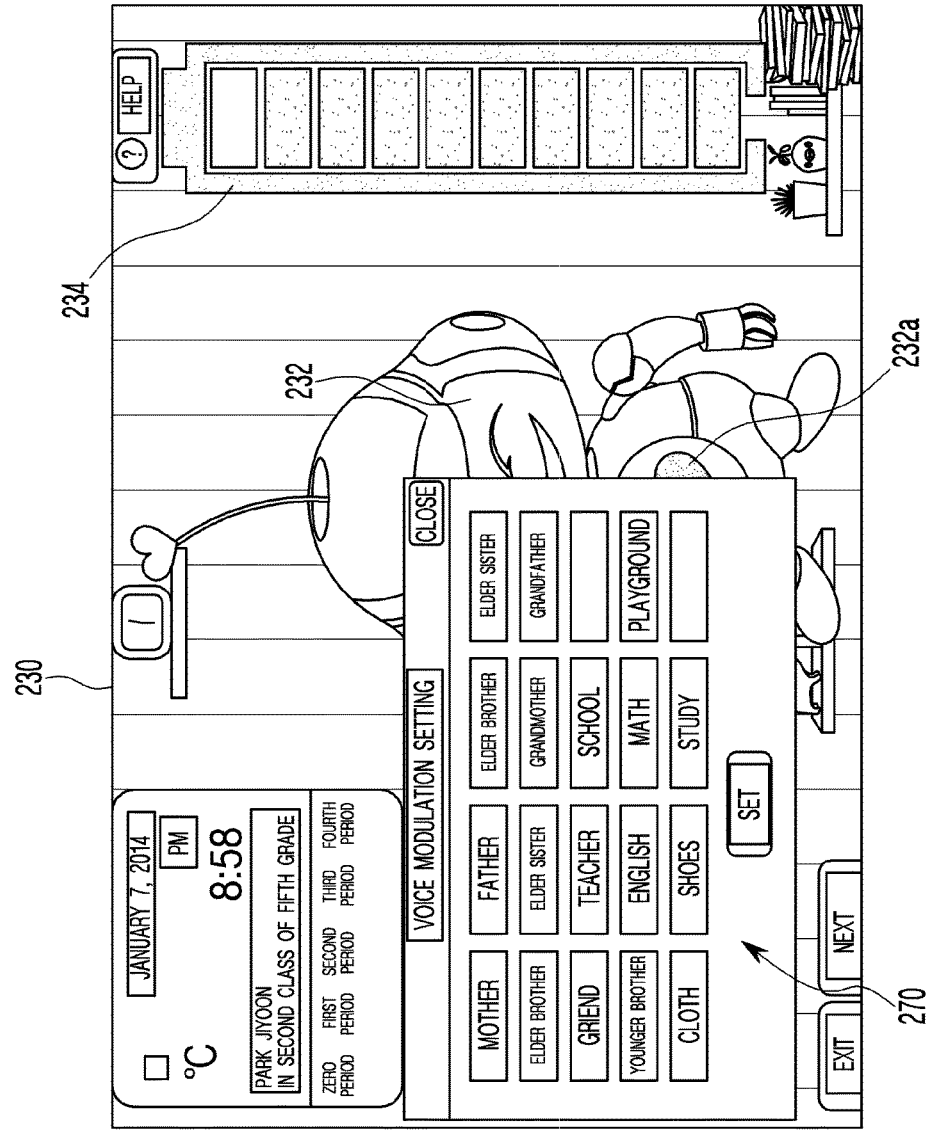
FIG. 15 a view schematically illustrating a self-expression index input screen displayed on a member's terminal according to another embodiment of the present invention.
Figure 16:
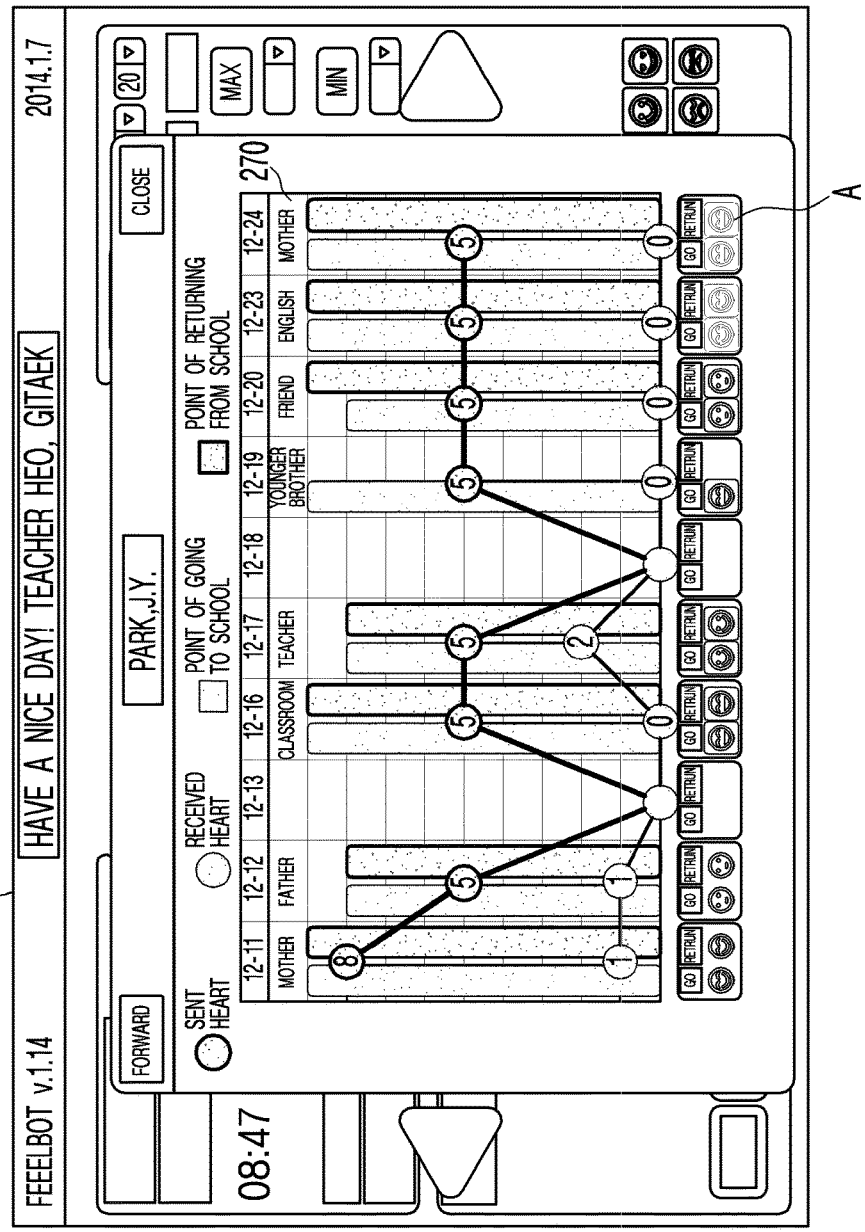
FIGS. 16 to 17 exemplarily illustrate screens displaying a statistical index in a manager's terminal according to another embodiment of the present invention.

FIG. 15 a view schematically illustrating a self-expression index input screen displayed on a member's terminal according to another embodiment of the present invention.

Referring to FIG. 15, a group member management support system 200 according to another embodiment of the present invention discloses a system for performing a match on a first index and a second index corresponding thereto and statistically processing the matched result, which uses a language element 270 of the second index as the self-expression index together with the first index such as the aforementioned expression of avatar 232, the color 232a, and the point 234 through which psychology or feeling is objectively figured out, as the self-expression index representing the psychology or feeling of each member. Accordingly, the language element 270, which is difficult to be quantified in correspondence to the psychology or feeling, is used as a relative self-expression index with respect to each member, and the language used by each member may be used for easily figuring out psychology or feeling, or for a counseling document. In an embodiment, a part that a detailed description is omitted in relation to the database 220, interface server 210, member terminal 230, and manager's terminal 240, is the same as the aforementioned part, and hereinafter, a description is provided about a configuration different from the aforementioned embodiment.

In the embodiment, in correspondence to a degree of psychology or feeling of a member, the self-expression index includes the first index including one or more of indexes including the expression of the avatar 232 changing according to a state where any one of two or more icon shapes preset in the member's terminal 230, the color 232a changing according to a state where any one of two or more colors preset in the member's terminal, and the input point 234 among points preset in the member's terminal 230, and the second index formed of language element 270 input to the member's terminal 230 in correspondence to the degree of the psychology or feeling of the member. For example, as described above in relation to the first index on the screen of the member's terminal 230, after inputting the expression of the avatar 232, color 232a, and point 234, when a screen for requesting an input of the language element 270 as the second index is displayed, the language element 270 desired to be transmitted is input and performed.

At this point, the language element 270 is an element representable with the character useable through a typical language habit, and may include, for example, words, phrases, and sentences. In addition, an input of the second index, for example, as illustrated in FIG. 15, when the preset language elements 270 are presented on the screen of the member's terminal 230, an input is performed according to selection (touch), or by directly entering language element 270 by the member when a language element entering window is displayed. An input time of the language element 270 may be, for example, set to several seconds as shortly as possible to represent current psychology or feeling without a change in a view of linguistic psychology.

In the embodiment, the interface server 210 includes a self-expression index statistics generation module 213 to store the generated self-expression index statistics in the database 220. The manager's terminal 240 requests and receives from the interface server 210 the self-expression index statistics for a predetermined period to display or output the self-expression index statistics.

The self-expression index statistics generating module 213 may generate various statistics indexes including a change detail in the first index including change details A in the avatar expression, change details in the point (see bar graph for each date in the drawing) for a predetermined period, and change details A in the color, and a graph including change details in a specific word 270 as the second index input corresponding to the input first index.

The manager terminal 240 may request and receive from the interface server 210 the self-expression index statistics including the first and second indexes during a predetermined period through the network 250, and display or output various self-expression index statistics by selecting (touching) an icon displayed for each member on the screen of the manager's terminal 240.

Figure 17:
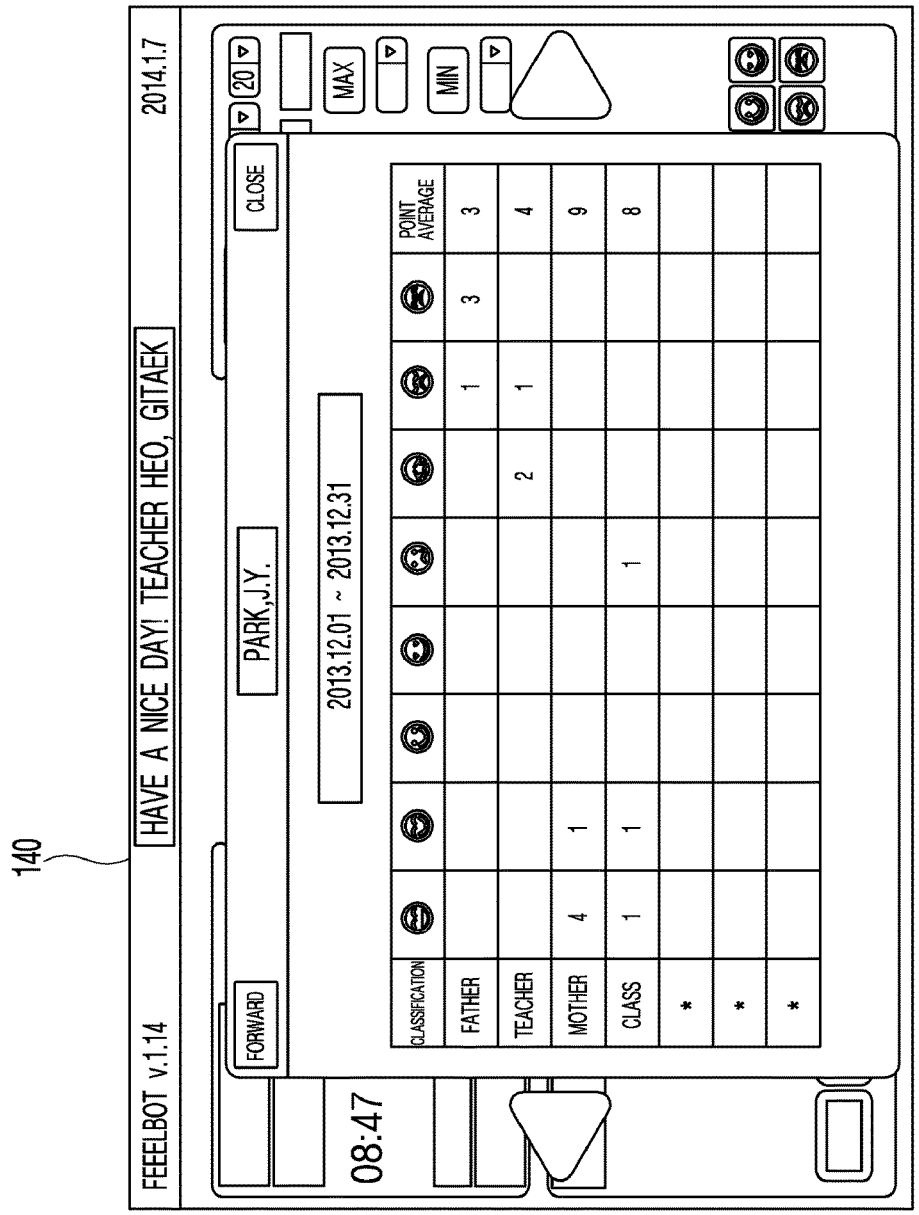

Here, as illustrated in FIG. 17, the manager's terminal 240 may display or output statistics of the first index input in correspondence to an input of the second index with respect to the second index input during a predetermined period preset in the manager's terminal 240. In other words, based on the specific word 270, the number of correspondingly input expression times of the specific avatar 232, the number of the specific colors 232a, or statistics representing an accumulated value or average of the point 234 may be displayed or output. For example, it may be seen that a word such as 'father' or 'teacher', which is difficult to quantify in corresponding to the psychology or feeling, is used in a state where psychology or feeling is not relatively good according to individual members. Accordingly, the manager uses as the self-expression index the language element 270 difficult to quantify in correspondence to the psychology or feeling, and easily figures out that through a language used by each member, the corresponding language element 270 is used in what state of psychology or feeling of the member.

Furthermore, the group member management support system 100 according to the present invention may further include an observer terminal 160 receiving the self-expression index statistics or item processing statistics from the manager's terminal through the network 150. Through this, an observer such as a school parent having close fellowship with the member and manager may share with the manager the self-expression index statistics or item processing statistics according to the psychology or feeling for a corresponding member of interest. Such an observer's terminal 160 requests and receives from the manager's terminal 140 the self-expression index statistics and item processing statistics for a specific member to display on or output to the manager's terminal 160, and may also transmit the self-expression index and item processing statistics for the specific member. In addition, the manager' terminal 140 may also transmit the self-expression index and item processing statistics for the specific member to the observer's terminal 160.

Group Member Management Support Method

Figure 18:
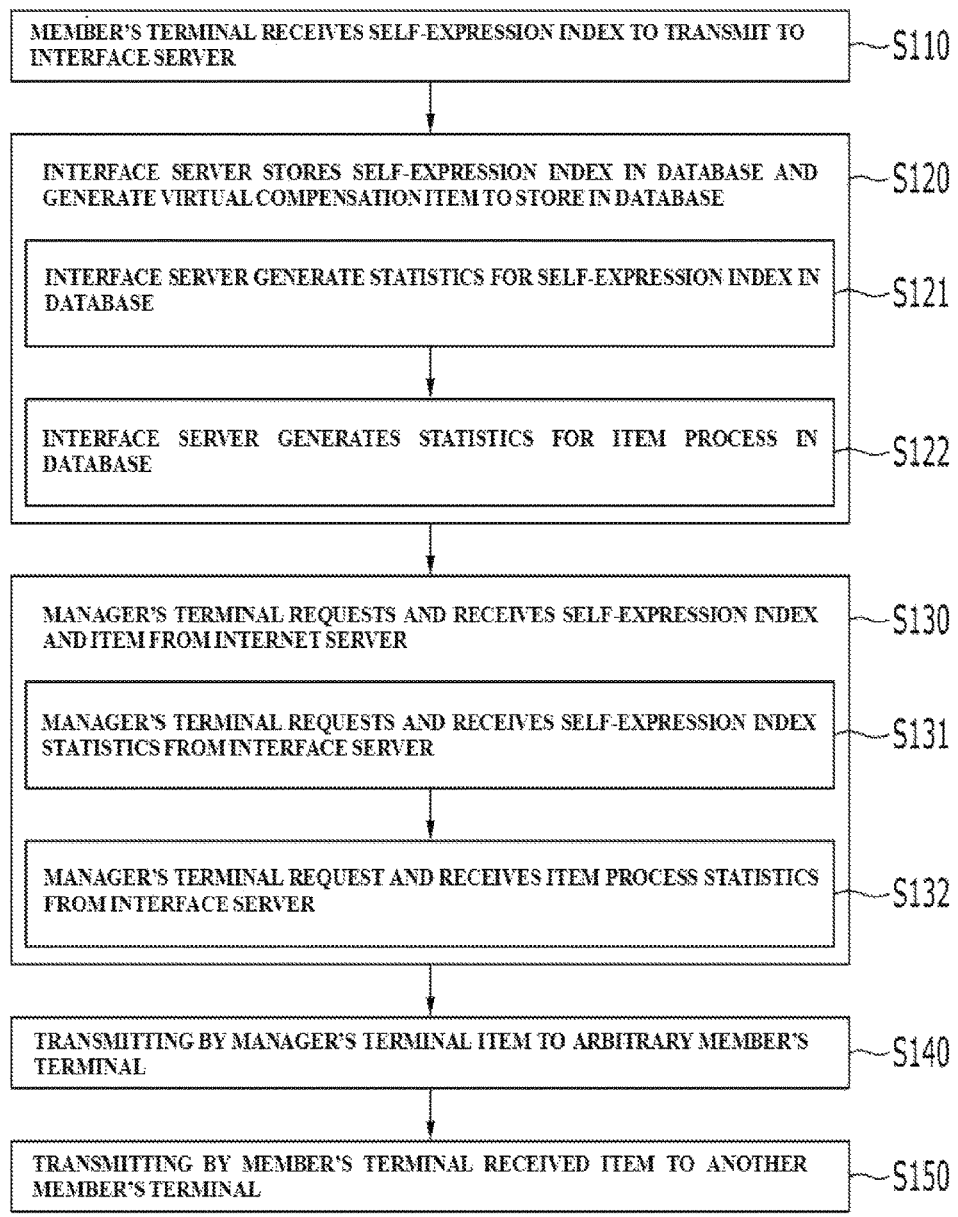
FIG. 18 is a view sequentially illustrating a method of supporting group member management according to an embodiment of the present invention.
Figure 19:
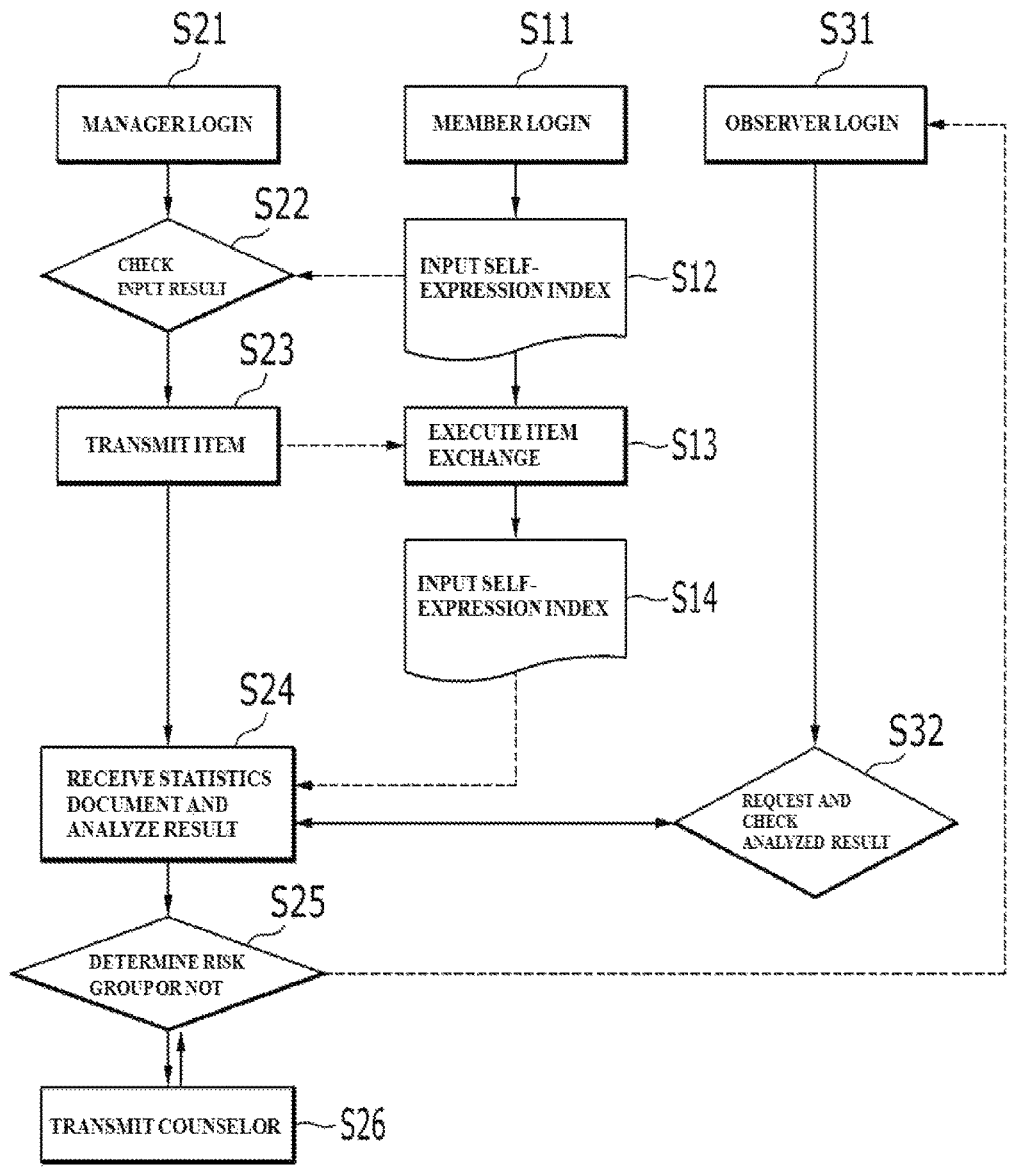
FIG. 19 is a view illustrating an overall flow of the present invention on the basis of display content shown on a screen of each user terminal when performing the method in relation to FIG. 18.

FIG. 18 is a view sequentially illustrating a group member management support method according to an embodiment of the present invention, and FIG. 19 is a view for explaining the overall flow of the present invention on the basis of display content displayed on each user terminal' screen at the time of performing the method according to FIG. 18.

First, referring to FIG. 18, and FIGS. 1 to 11, the group member management support method according to the present invention basically includes: (a) receiving S110, by the member's terminal 130, a self-expression index including expression of the avatar 132 changing according to a state where any one of two or more icon shapes 131 preset in the member's terminal 130 in correspondence to a degree of psychology or feeling of a member, and an input point of points 134 preset in the member's terminal 130, and transmitting to the interface server 110; (b) storing S120, by the interface server 110, the self-expression index in the database 120, and generating statistics for the self-expression index including change details (see FIG. 7) in the avatar expression and point during a predetermined period to store in the database, and generating a virtual compensation item 142 to store in the database 120; (c) requesting and receiving S130, by the manager's terminal 140 from the interface server 110), the self-expression index, self-expression statistics, and item 142 during a predetermined period; (d) transmitting S140, by the manager's terminal 140, the item 142 to an arbitrary member's terminal 130; and (e) transmitting S150, by the member's terminal 130, the received item 142 to another member's terminal 130.

The operation (a) S110 is an operation for receiving, by the interface server 110, the self-expression index from a member using a web browser or application through the network 150, and then in operation (b) S120, the interface server 110 generates the virtual compensation item to store it in the database 120 together with the input self-expression index.

Like this, the constructed database 120 receives a request for the self-expression index, self-expression index statistics, and specific item 142 for a specific member from the manager's terminal 140, and transmits them to the manager's terminal 140. The manager's terminal 140 may display the self-expression index, the self-expression statistics, or an item list through an image display means, or output them through a printing means.

At this point, the item 142 transmitted to an displayed on the manager's terminal 140, as in an operation (d) S140, may be transmitted from the manager's terminal 140 to an arbitrary member' terminal 130, and as in an operation (e) S150, the manage' terminal 140 may transmit the received item 142 to another member's terminal 130.

In operation (b) S120 in the present invention, the interface server 110 generates statistics for the self-expression index and stores it in the database, and at this point, in operation (c) S130, requesting and receiving, by the manager' terminal 140, the self-expression index statistics from the interface server 110 is performed. Accordingly, as described above, the manager may figure out at one view a change degree together with recent psychology or feeling state for each member of a corresponding group. Here, when receiving a range of the number of specific avatar' expression times during a predetermined period present in the manager' terminal 140 or the self-expression index included in a point range preset in the manager's terminal, the manager's terminal displays or outputs a notification about who is a corresponding member, and accordingly figures out a member belonging to a risk group easily in real time.

In addition, in operation (b) S120 of the present invention, an operation S122 for generating, by the interface server 110, statistics for an item process to store it in the database 120 is further performed, and at this point, in operation (c) S3130, an operation S132 for requesting and receiving, by the manager's terminal 140, item process statistics from the interface server 110 is further performed. Accordingly, the manager may check the present exchange flowchart 144 between members on the manager's terminal 140.

Here, the item process statistics includes change details (see FIG. 7) in the number of item transmission and reception times during a predetermined period for each member, and accordingly, the manager may figure out whether each member of a corresponding group maintains active friend relations, and the manager's terminal 140 displays or outputs the item exchange flow chart 144 between members during the predetermined period. When receiving item process statistics included in a range of the number of item reception times or in a range of the number of possessed items during a predetermined period preset in the manager's terminal 140, the manager's terminal 140 displays or outputs a notification about who is a corresponding member to easily figure out a member belonging a risk group that does not maintain active friend relations in real time.

Furthermore, after operation (e) S150 of the present invention, an observer's terminal 160 may further included and an operation (f) S160 for transmitting, by the manager's terminal, the self-expression index statistics or item process statistics to the observer's terminal 160 may be further performed. In other words, the observer terminal 160 may request and receive from the manager's terminal 140 the self-expression index statistics and item processing statistics for a specific member to display on or output to the observer's terminal 160. The manager' terminal 140 may also transmit the self-expression index and item processing statistics for a specific member to the observer's terminal 160. Accordingly, as described above, an observer having close fellowship with the member and manager may share with the manager the self-expression index statistics or item processing statistics according to the psychology or feeling for a corresponding member of interest.

Next, referring to FIG. 19, and FIG. 1 to FIG. 11, a description is provided for an entire flow of the present invention on the basis of display content displayed on a screen of each user terminal.

First, when a member performs a login (operation S11) through the member's terminal 130 and then checks and inputs (stores) (operation S12) an item corresponding to an self-expression index pre-displayed on the screen of the terminal 130, the result may be stored in the database 120 through a medium of interface server 110 and checked (operation S22) in the manager's terminal 140 by a manager's request.

The manager may perform login (operation S21) through the manager's terminal 140, check (operation S22) an input result of the self-expression index in a self-expression index check board (see FIG. 5 or FIG. 6) of each member pre-displayed on a screen of the terminal 140, and transmit (operation S23) to entire or some of the members the compensation item (see FIG. 11) separately requested and received through the interface server 110. The member receiving the item may transmit an item to another member's terminal 130 to perform (operation S13) item exchange between members.

Hereinafter, after the item transmission (operation S23) and change (operation S13) is performed during a predetermined period (e.g., normally once or twice/day), each member may check and input (operation S14) again the self-expression index through the aforementioned method, the result may be transmitted to the manager's terminal 140, and the manager analyzes (operation S24) self-expression index input data, the self-expression index statistics and the item process statistics data separately requested and received through the interface server 110 to check and review an internal state according to a current psychology or feeling change for each member, and checks an unusual point.

A reviewed result analyzed for each member by the manager's terminal 140 may be transmitted to a specific observer's terminal 160 all the time, and accordingly the observer may continuously figure out (operation S32) a friend relation situation in the group of a corresponding member through comments of the manager together with the self-expression index statistics and item process statistics for a member of interest through a separate login (operation S31).

Furthermore, when the manager determines (operation S25) that a specific member belongs to a risk group based on the result received by the manager's terminal 140 and the aforementioned notification function, the determined result is transmitted to a corresponding observer's terminal 160 and at the same time, transmitted (operation S26) to a separately installed counselor's terminal to enable counseling and psychological treatment for the member belonging to the risk group to be performed rapidly and smoothly.

According to a preferred embodiment, the counselor, who receives information on the member belonging to the risk group from the manager's terminal 140, performs substantial counseling with the corresponding member, inputs the result to his/her terminal, and transmits the result to the manager's terminal. Accordingly, the manager may be fed back the counseling result for the member belonging to the risk group on the system of the present invention.

The above-described group member management support method according to an embodiment of the present invention may be implemented in a program instruction type performable through various computer elements to be recorded on a computer readable recording medium. The computer readable recording medium may include a program instruction, data file, and data structure independently or in a combination manner. The program instruction recorded on the computer readable recording medium is particularly designed and configured for the present invention, but may be known to those skilled in the art of computer software field to be useable. Examples of the computer readable recording medium include a magnetic medium including a hard disk, floppy disk, and magnetic tape, an optical recording medium such as a CD-ROM and DVD, a magneto-optical media such as a floptical disk, and a hardware device particularly configured to store and execute the program instructions such as ROM, RAM, and flash memory. A program instruction may include high-level language code executable by a computer using an interpreter in addition to machine code created by a complier. The hardware device may be configured to operate as at least one software module to perform an operation of various embodiments and vice versa.

Hereinafter, embodiments of the present invention will be described in detail with reference to the accompanying drawings. The foregoing description of the present invention has been presented for the purposes of illustration and description. It is apparent to a person having ordinary skill in the art to which the present invention relates that the present invention can be easily modified into other detailed forms without changing the technical principle or essential features of the present invention.

The scope of the present invention is presented by the accompanying Claims rather than the foregoing description. It should be understood that all changes or modifications derived from the definitions and scopes of the Claims and their equivalents fall within the scope of the present invention.

The invention claimed is:

1. A group member management support system comprising:
   a processor;
   a database storing self-expression index representing psychology or feeling of each member of a group;
   an interface server receiving the self-expression index through a network from the member to store the self-expression index in the database;
   a member's terminal receiving the self-expression index to transmit the self-expression index to the interface server through the network; and
   a manager's terminal requesting and receiving the self-expression index from the interface server through the network to display or output the self-expression index,
   wherein the self-expression index is represented as an index comprising avatar expression changing according to a state where any one of two or more icon shapes preset in the member' terminal in correspondence to psychology or feeling of the member and an input point among points preset in the member's terminal,
   wherein the interface server comprises a self-expression index statistics generation module to store the generated self-expression index statistics in the database, and the manager's terminal requests and receives from the internet server the self-expression index statistics during a predetermined period through the network to display or output the self-expression index statistics,
   wherein the self-expression index statistics comprises change details in the avatar's expression and points during the predetermined period, wherein, when receiving the self-expression index statistics included in a range of the number of specific avatar expression times and a point range preset in the manager's terminal during the predetermined period, the manager's terminal displays or outputs a notification identifying a corresponding member having the change details in the avatar's expression and the points during the predetermined period, wherein the preset two or more icon shapes are displayed around a region where the avatar expression is displayed in the member's terminal until the avatar expression changes, and wherein a color unit is displayed which represents a degree of psychology or feeling of the member in a portion of region of the avatar other than the avatar expression, and a color wheel is displayed therearound until the time of change thereof according to an input of the color wheel where two or more colors are deployed.

2. The group member management support system of claim 1, wherein the interface server receives the self-expression index from the member through a web browser or an application installed in a mobile device.

3. The group member management support system of claim 1, wherein when receiving the self-expression index included in the number of a specific color times preset in the manager's terminal during the predetermined time, the manager's terminal displays or outputs the notification identifying the corresponding member.

4. The group member management support system of claim 1, wherein the self-expression index statistics further comprises an average of the point during the predetermined period, wherein when receiving the self-expression index included in a range of the average point pre-determined in the manager's terminal during the predetermined time, the manager's terminal displays or outputs the notification identifying the corresponding member.

5. The group member management support system of claim 1, wherein the interface server comprises an item management module generating and processing a virtual compensation item, stores information on the generated and processed item in the database, requests and receives the item from the interface server through the network, and transmits the item to an arbitrary member's terminal through the network, and the member's terminal transmitting the item to another member's terminal, the interface server calculates statistics for the item processed by the item management module and stores the calculated item process statistics in the database, and the manager' terminal requests and receives from the interface server the item process statistics through the network to display or output the item process statistics, the item process statistics comprises the change details in the number of item transmission and reception times for each member, and the manager's terminal displays or outputs a flowchart of item exchanges between members during the predetermined period.

6. The group member management support system of claim 5, wherein when receiving the item process statistics included in a range of the number of item reception times or a range of the number of possessed items preset in the manager's terminal during the predetermined time, the manager's terminal displays or outputs the notification identifying another member that is associated with the corresponding member.

7. The group member management support system of claim 5, wherein the manager's terminal displays or outputs the flowchart of the item exchange between members selected according to selection of an icon symbolizing the self-expression index for each member displayed on the manager's terminal, or displays or outputs the number of item transmission and reception times preset in the manager's terminal during the predetermined period.

8. The group member management support system of claim 5, wherein the manager's terminal displays or outputs information identifying other members in an order of the large number of the item transmission and reception times preset in the manager's terminal during the predetermined period on the basis of members selected according to selection of an icon symbolizing the self-expression index for each of the members displayed on the manager's terminal.

9. The group member management support system of claim 1, wherein the internet server comprises a mail management module managing mails transmitted and received between members through the member's terminals to store the transmitted and received mails in the database and calculates statistics for the transmitted and received mails, and stores the calculated mail statistics in the database, and the manager's terminal requests and receives the mail statistics from the internet server through the network to display or output the mail statistics, the mail statistics comprises the number of mail transmission and reception times during the predetermined period between members, and the manager's terminal displays or outputs the number of mail transmission and reception times during the predetermined period.

10. The group member management support system of claim 9, wherein the mail comprises a voice mail, and the member's terminal comprises a voice modulation unit capable of selecting a specific voice mode at the time of transmitting the voice mail.

11. The group member management support system of claim 1, further comprising an observer's terminal receiving the self-expression index statistics or item process statistics.

12. A group member management support system comprising:

a processor;

a database storing self-expression index representing psychology or feeling of each member of a group;

an interface server receiving the self-expression index through a network from the member and storing the self-expression index in the database;

a member's terminal receiving the self-expression index and transmitting the self-expression index to the interface server through the network; and a manager's terminal requesting and receiving the self-expression index from the interface server through the network to display or output the self-expression index, wherein the self-expression index comprises a first index comprising one or more of avatar expression changing according to a state where any one of two or more icon shapes present in the member's terminal in correspondence to a degree of psychology or feeling of the member, a color changing according to a state where any one of two or more colors preset in the member's terminal, and an index comprising an input point of points preset in the member's terminal, and a second index formed of a language element input to the member's terminal in correspondence to the degree of psychology or feeling of the member, wherein the interface server comprises a self-expression index statistics generation module to store the generated self-expression index statistics in the database, and the manager's terminal requests and receives from the internet server the self-expression index statistics during a predetermined period through the network to display or output the self-expression index statistics, wherein the self-expression index statistics comprises change details in the first and second indexes during the predetermined period, wherein the manager's terminal displays or outputs statistics of the first index input in correspondence to an input of the second index with respect to the second index input during the determined period preset in the manager's terminal that identifies a correlation between the language element used in relation to the degree of psychology or feeling, wherein the preset two or more icon shapes are displayed around a region where the avatar expression is displayed in the member's terminal until the avatar expression changes, and wherein a color unit is displayed which represents a degree of psychology or feeling of the member in a portion of region of the avatar other than the avatar expression, and a color wheel is displayed therearound until the time of change thereof according to an input of the color wheel where two or more colors are deployed.

13. The group member management support system of claim 12, wherein the second index is selected from among a language element group displayed during the predetermined period on the member's terminal and input.

14. The group member management support system of claim 12, wherein the statistics of the first index is the number of the avatar expression or color times, or an accumulated or average of the point.

15. A group member management support method comprising:

receiving, by a member's terminal, a self-expression index comprising expression of the avatar, which changes according to a state where any one of two or more icon shapes preset in the member's terminal is input in correspondence to a degree of psychology or feeling of a member, and an input point of points preset in the member's terminal, and transmitting the self-expression index to the interface server;

storing, by the interface server, the self-expression index in the database, and generating statistics for the self-expression index comprising change details in the avatar expression and point during a predetermined period to store in the database, and generating a virtual compensation item to store in the database;

requesting and receiving, by the manager's terminal, the self-expression index, the self-expression statistics, and the item from the interface server during the predetermined period;

transmitting, by the manager's terminal, the item to an arbitrary selected member's terminal; and transmitting, by the member's terminal, the received item to another member's terminal, wherein when receiving the self-expression index statistics included in a range of the number of specific avatar expression times during a predetermined period and a point range preset in the manager's terminal, the manager's terminal displays or outputs a notification identifying a corresponding member that is associated with the arbitrary member, wherein the preset two or more icon shapes are displayed around a region where the avatar expression is displayed in the member's terminal until the avatar expression changes, and wherein a color unit is displayed which represents a degree of psychology or feeling of the member in a portion of region of the avatar other than the avatar expression, and a color wheel is displayed therearound until the time of change thereof according to an input of the color wheel where two or more colors are deployed.

16. The group member management support method of claim 15, further comprising:

generating, by the interface server, statistics for the item process to store the statistics in the database; and requesting and receiving, by the manager's terminal, the item process statistics from the interface server, wherein the item process statistics comprises change details in the number of item transmission and reception times for each member during the predetermined period, and wherein the manager's terminal displays or output a flowchart of item exchanges between members during the predetermined period, and when receiving the item process statistics included in a range of the number of item reception times or a range of the number of possessed items during the predetermined period preset in the manager's terminal, displays or outputs the notification identifying the corresponding member.

17. The group member management support method of claim 16, further comprising transmitting, by the manager's terminal, the self-expression index statistics or item process statistics to an observer's terminal.

18. A non-transitory computer-readable medium having embodied thereon a program, which when executed by a computer causes the computer to execute a method, the method comprising:

receiving, by a member's terminal, a self-expression index comprising expression of the avatar, which changes according to a state where any one of two or more icon shapes preset in the member's terminal is input in correspondence to a degree of psychology or feeling of a member, and an input point of points preset in the member's terminal, and transmitting the self-expression index to the interface server;

storing, by the interface server, the self-expression index in the database, and generating statistics for the self-expression index comprising change details in the avatar expression and point during a predetermined period to store in the database, and generating a virtual compensation item to store in the database;

requesting and receiving, by the manager's terminal, the self-expression index, the self-expression statistics, and the item from the interface server during the predetermined period;

transmitting, by the manager's terminal, the item to an arbitrary selected member's terminal; and transmitting, by the member's terminal, the received item to another member's terminal, wherein when receiving the self-expression index statistics included in a range of the number of specific avatar expression times during a predetermined period and a point range preset in the manager's terminal, the manager's terminal displays or outputs a notification identifying a corresponding member that is associated with the arbitrary member, wherein the preset two or more icon shapes are displayed around a region where the avatar expression is displayed in the member's terminal until the avatar expression changes, and wherein a color unit is displayed which represents a degree of psychology or feeling of the member in a portion of region of the avatar other than the avatar expression, and a color wheel is displayed therearound until the time of change thereof according to an input of the color wheel where two or more colors are deployed.

\* \* \* \* \*